US012478124B2

(12) United States Patent
Sharrah et al.

(10) Patent No.: US 12,478,124 B2
(45) Date of Patent: Nov. 25, 2025

(54) HEADWEAR-MOUNTABLE ATTACHMENT DEVICE FOR SUPPORTING A LIGHTING DEVICE OR OTHER TOOL OR ACCESSORY, OR KIT INCLUDING SAME

(71) Applicant: Streamlight, Inc., Eagleville, PA (US)

(72) Inventors: Raymond L. Sharrah, Collegeville, PA (US); Jonathan R. Sharrah, Phoenixville, PA (US); Matthew B. Dalton, Elkins Park, PA (US)

(73) Assignee: Streamlight, Inc., Eagleville, PA (US)

( * ) Notice: Subject to any disclaimer, the term of this patent is extended or adjusted under 35 U.S.C. 154(b) by 1 day.

(21) Appl. No.: 18/195,729

(22) Filed: May 10, 2023

(65) Prior Publication Data

US 2023/0363482 A1 Nov. 16, 2023

Related U.S. Application Data

(60) Provisional application No. 63/340,340, filed on May 10, 2022.

(51) Int. Cl.
*A42B 3/04* (2006.01)
*F21V 21/08* (2006.01)

(52) U.S. Cl.
CPC ............ *A42B 3/044* (2013.01); *A42B 3/0446* (2013.01); *F21V 21/0816* (2013.01)

(58) Field of Classification Search
CPC ......... A42B 3/003; A42B 3/04; A42B 3/0406; A42B 3/0433; A42B 3/044; A42B 3/0446; F21V 21/0816; F21V 21/084
USPC ...................................... 2/422; 362/105, 106
See application file for complete search history.

(56) References Cited

U.S. PATENT DOCUMENTS

| | | | | |
|---|---|---|---|---|
| 5,608,919 A * | 3/1997 | Case | A42B 3/04 362/106 |
| 2016/0183620 A1* | 6/2016 | Moreau | A42B 3/08 2/421 |
| 2018/0192726 A1* | 7/2018 | Chen | A42B 3/0406 |
| 2018/0352942 A1* | 12/2018 | Downs | F21V 33/0008 |
| 2023/0131959 A1* | 4/2023 | Hunt | A42B 3/04 2/422 |

OTHER PUBLICATIONS

URL: <https://www.https://www.streamlight.com/products/detail/vantage>; "Vantage LED Helmet Light", Streamlight Inc., retrieved on May 10, 2023 (2 pages).
URL:<https://www.streamlight.com/products/detail/index/vantage-ii-helmet-light>; "Vantage II LED Helmet Light", Streamlight Inc., retrieved on May 10, 2023 (2 pages).
URL:<https://www.streamlight.com/products/detail/vantage-ii-gallet-helmet-light>; "Vantage II Gallet Helmet Light", Streamlight Inc., retrieved on May 10, 2023 (2 pages).
URL:<https://www.streamlight.com/products/detail/polytac-helmet-lighting-kit>; "Polytac Helmet Lighting Kit", Streamlight Inc., retrieved on May 10, 2023 (2 pages).

(Continued)

*Primary Examiner* — Laura K Tso
(74) *Attorney, Agent, or Firm* — Quarles & Brady LLP; James J. Aquilina

(57) ABSTRACT

Embodiments of an attachment device for supporting a lighting device or other tool or accessory from a hat or helmet, or a kit including same, are shown and described.

18 Claims, 19 Drawing Sheets

(56) References Cited

OTHER PUBLICATIONS

URL:<https://www.foxfury.com/product/sideslide-c-clamp-side-mounted-helmet-light/>; "SideSlide C-Clamp Side Mounted Helmet Light", FoxFury Lighting Solutions, retrieved on May 10, 2023 (8 pages).
URL:<https://www.foxfury.com/product/performance-intrinsic-tasker-led-helmet-light/>; "Performance Intrinsic Tasker LED Helmet Light", FoxFury Lighting Solutions, retrieved on May 10, 2023 (7 pages).
URL:<https://www.foxfury.com/product/command-plus-tilt-white-led-headlamp-helmet-light/>; "Command+ Tilt White LED Headlamp/Helmet Light", FoxFury Lighting Solutions, retrieved on May 10, 2023 (9 pages).
URL:<https://gopro.com/en/US/shop/mounts-accessories/vented-helmet-strap-mount/GVHS30.html>; Vented Helmet Strap Mount, GoPro, retrieved on May 10, 2023 (3 pages).
Streamlight VANTAGE Operating Instructions; Streamlight, Inc.; Rev. D; Jul. 2013 (20 pages).
Streamlight VANTAGE II Operating Instructions; Streamlight, Inc.; Rev. D; Jul. 2013 (16 pages).

* cited by examiner

HEADWEAR-MOUNTABLE ATTACHMENT DEVICE FOR SUPPORTING A LIGHTING DEVICE OR OTHER TOOL OR ACCESSORY, OR KIT INCLUDING SAME

CROSS-REFERENCE TO RELATED APPLICATION

The present application claims the domestic benefit of, and hereby incorporates by reference the entirety of, U.S. Provisional Application No. 63/340,340, filed May 10, 2022 and entitled "HELMET-MOUNTABLE ATTACHMENT DEVICE FOR SUPPORTING A LIGHTING DEVICE OR OTHER TOOL OR ACCESSORY, OR KIT INCLUDING SAME."

FIELD OF THE DISCLOSURE

The present disclosure relates to the field of headwear-mountable attachment devices for attaching tools or accessories, for example a lighting device to, for example, a hat or helmet, or a kit comprising one or more straps and/or one or more clips and/or one or more alternative fasteners that can be used to attach the strap(s) and/or lighting device to a variety of headwear types.

BACKGROUND

Headwear-mountable lights, including various helmet-mountable lights, are known in the art. Examples of these lights include the Vantage and Vantage II lights manufactured and sold by Streamlight, Inc. of Eagleville, Pennsylvania, U.S.A., which is the applicant of the present application. Existing helmet-mountable lights are either clipped directly to a helmet or supported by a strap that is stretched around the circumference of the helmet, so that the strap is routed approximately parallel to the lower edge or brim line of a helmet. Moreover, some existing hat-mountable lights are attachable to the brim of a hat via a clip. When mounted to straps that are routed around the outside of a helmet, a light is generally attached to the strap either on one side of the helmet (e.g., approximately above one ear) or directly in the front of the helmet (e.g., approximately in front of the forehead). In these locations, the attached light causes weight imbalance on the helmet and can also interfere with the attachment of additional tools or accessories to the helmet. For example, on a military, rescue, or safety helmet, a front-mounted light might interfere with the attachment of night-vision goggles (NVGs) to the front of the helmet and on a fireman's helmet might interfere with the identification plaque which is generally located at the front of a fireman's helmet. Side-mounted lights, moreover, can interfere with the use of headsets, earmuffs, visors, radios, and other accessories which might be located in or attached to the helmet in the same general location.

There is therefore a need for improved attachment devices including strap(s) and/or kits including strap(s) and clip(s) for headwear-mountable lighting devices that overcome the drawbacks present in the relevant prior art devices.

BRIEF DESCRIPTION OF THE DRAWINGS

The devices according to the present disclosure are further described with reference to the accompanying drawings, in which.

DETAILED DESCRIPTION

Figure 1:
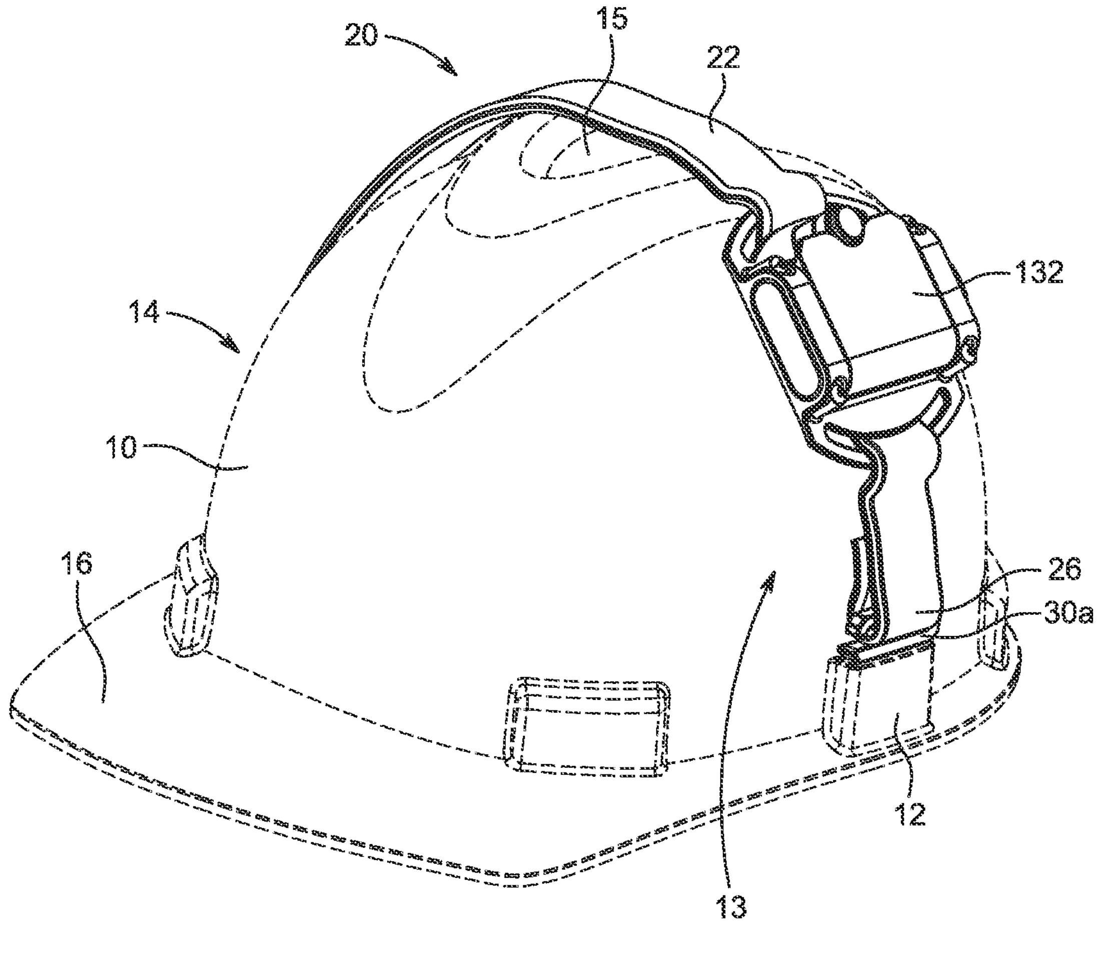
FIG. 1 is a perspective view of a first helmet attachment device according to the present disclosure, shown in an attached configuration with respect to a first exemplary helmet, and including a first embodiment of a lighting device attached thereto.

The ensuing detailed description provides exemplary embodiment(s) only, and is not intended to limit the scope, applicability, or configuration of the herein disclosed embodiment(s). Rather, the ensuing detailed description of the exemplary embodiment(s) will provide those skilled in the art with an enabling description for implementing the exemplary embodiments in accordance with the present disclosure. It should be understood that various changes may be made in the function and arrangement of elements without departing from the spirit and scope of the invention, as set forth in the appended claims.

To aid in describing the disclosure and/or invention as claimed, directional terms may be used in the specification and claims to describe portions of the present disclosure and/or invention (e.g., upper, lower, left, right, etc.). These directional definitions are merely intended to assist in describing the embodiment(s) and claiming the invention, and are not intended to limit the disclosure or claimed invention in any way. In addition, reference numerals that are introduced in the specification in association with a drawing figure may be repeated in one or more subsequent figures without additional description in the specification, in order to provide context for other features.

It should be understood that when an element is referred to as being "connected" or "coupled" to another element, it can be directly connected or coupled to the other element or that intervening elements may be present. In contrast, when an element is referred to as being "directly connected" or "directly coupled" to another element, it should be understood that no intervening elements are present. Other words used to describe the relationship between elements should be interpreted in a like fashion (e.g., "between" versus "directly between," "adjacent" versus "directly adjacent," etc.).

In safety, rescue, worksite, military, or related applications in which a helmet is generally worn and it is desirable or necessary to illuminate a scene while keeping a user's hands free, lights are commonly attached to helmets. Existing helmet-mountable lights are either clipped directly to a helmet or supported by a strap that is stretched around the circumference of the helmet, so that the strap is routed approximately parallel to the lower edge or brim line of a helmet. When mounted to straps that are routed around the outside of a helmet, a light is generally attached to the strap either on one side of the helmet (e.g., approximately above one ear) or directly in the front of the helmet (e.g., approximately in front of the forehead). In these locations, the attached light causes weight imbalance on the helmet and can also interfere with the attachment of additional tools or accessories to the helmet. For example, on a military, rescue, or safety helmet a front-mounted light might interfere with the attachment of night-vision goggles (NVGs) to the front of the helmet and on a fireman's helmet might interfere with the identification plaque which is generally located at the front of a fireman's helmet. Side-mounted lights, moreover, can interfere with the use of headsets, earmuffs, visors, radios, and other accessories which might be located in or attached to the helmet in the same general location.

Moreover, some existing hat-mountable lights are attachable to the brim of a hat via a clip. Even if clipped in the center of the brim, however, a light attached in this location can interfere with the user's vision and cause uncomfortable weight imbalances.

Accordingly, there is a need for improved attachment devices including strap(s) and/or kits including strap(s) and clip(s) for helmet-mountable lighting devices that overcome the drawbacks present in the relevant prior art devices. Applicant has therefore developed embodiments of an attachment device comprising one or more strap(s) and clips that attach to various helmet configurations such that the strap extends over the apex (i.e., crown, vertex, or top) of the helmet and user's head, where the lighting device is supported. In this location, the lighting device will be placed generally along a centerline of a user's body with its weight approximately centrally distributed atop the user's head, and located such that it will not interfere with any other helmet attachment, tool, or accessory that the user may wish to employ (for example NVGs, headsets, earmuffs, visors, and radios). Applicant has also developed various attachment devices and methods for soft hats (e.g., baseball-style caps), as will be described below.

Figure 10:
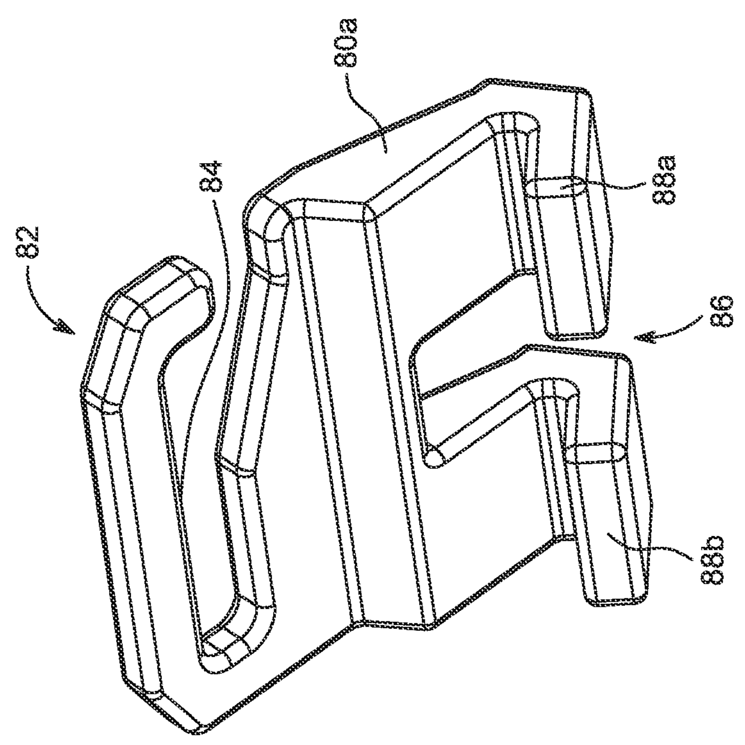
FIGS. 9 and 10 are perspective views of a second clip for an attachment device according to the present disclosure.
Figure 11:
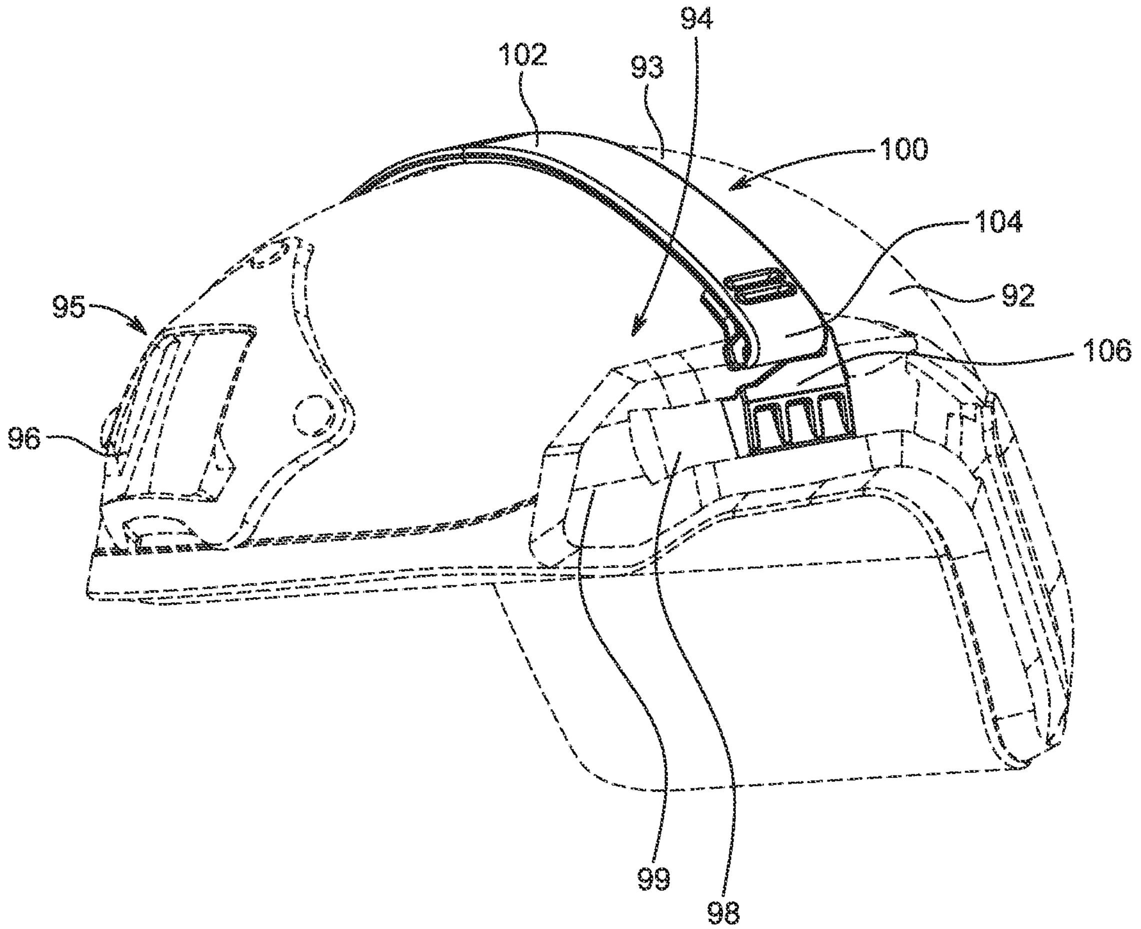
FIG. 11 is a perspective view of a fourth helmet attachment device according to the present disclosure, shown in an attached configuration with respect to a third exemplary helmet.
Figure 13:
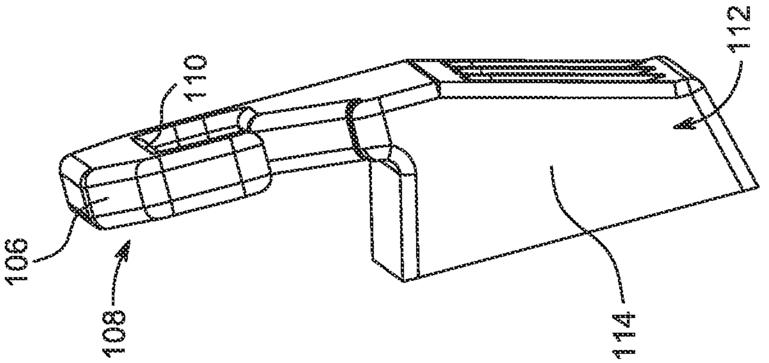
FIGS. 12 and 13 are perspective views of a third clip for an attachment device according to the present disclosure.
Figure 12:
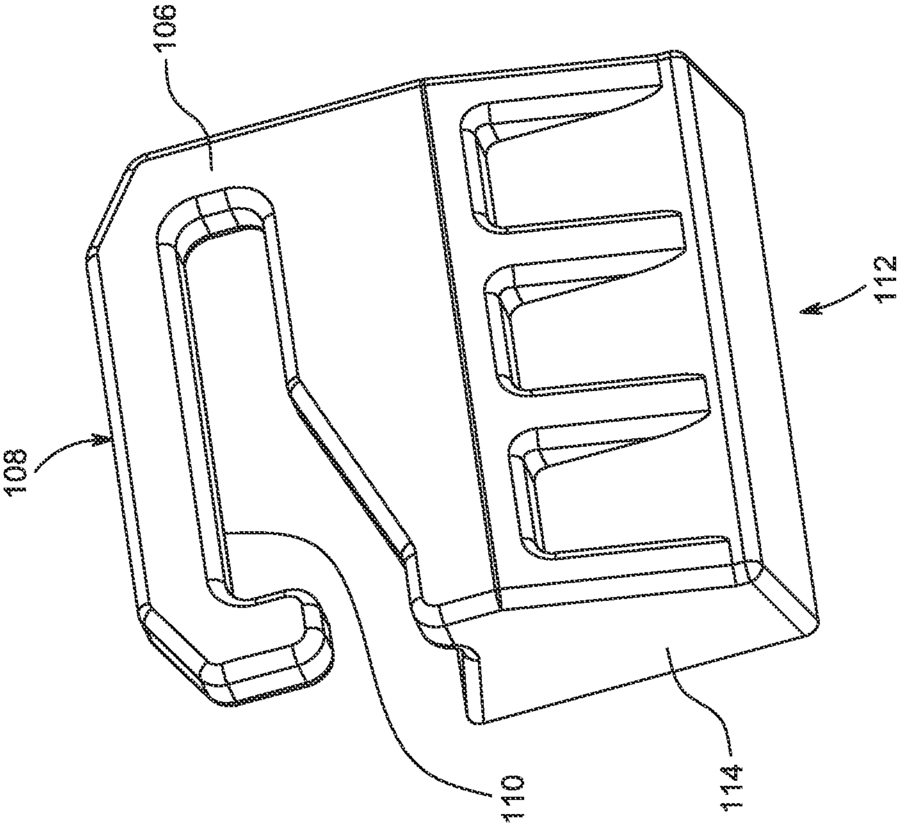

In some embodiments according to the present disclosure, one or more straps can be attached to a pair of clips that are sized and shaped to attach to a specific type of helmet, for example into an accessory slot in a safety helmet (for example a hard hat, see FIGS. 1-4, or a MSA Gallet rescue helmet, see FIGS. 14-16), around the brim of a fireman's helmet (see FIGS. 6-10), or into a tactical accessory slot of a military helmet (see FIGS. 11-13). The strap is then extendable over the apex of the helmet to allow for attachment of a lighting device to the strap at the apex of the helmet, or of one or more lighting devices to the strap along the length of the strap (i.e., in a direction roughly between the temples, over the apex of the helmet) when higher light output is desired. The strap could be of either adjustable or fixed length, and could be made of a fabric, elastic, or elasticized fabric material. One or more strap(s) and an appropriate pair of clips for a specific type of helmet could be sold together as a standalone product, with the clips being either removable or fixed to the strap. In the alternative, the strap(s) could be sold as a kit with multiple pairs of clips for different types of helmets. The strap(s) could be provided with a silicone backing to help keep them in place on the helmet(s) on which they are used.

Referring now to FIGS. 1-4, one embodiment of a helmet attachment device 20 according to the present disclosure will be described in detail. In this embodiment, the helmet attachment device 20 comprises a strap 22 and a pair of clips **30*a*,30*b*. In this embodiment, the strap 22 includes two fixed loops 24,26 at respective ends thereof so that the length of the strap 22** is not adjustable.

In this embodiment, the helmet attachment device 20 is shown attached to a first type of helmet 10, which is a common type of workplace safety helmet also known as a hard hat. The helmet 10 has a first lateral side 13 including a first attachment portion 12 and a second lateral side 14 including a second attachment portion (not shown, but identical to the first attachment portion 12). The helmet 10 further includes a brim 16 and has an apex 15 which corresponds with approximately the highest point of the user's head when the helmet 10 is worn. In this embodiment, the clip **30*a* is releasably attachable to the attachment portion 12 and the clip 30*b* is releasably attachable to the attachment portion located on the second lateral side 14 of the helmet 10. When both clips 30*a*,30*b* are attached to the helmet 10 in this way, the strap 22 is routed over or near the apex 15 of the helmet 10, which allows for the lighting device 132 to be attached to the strap 22 anywhere along the length of the strap 22, including in a location at or near the apex 15 of the helmet 10**.

Figure 3:
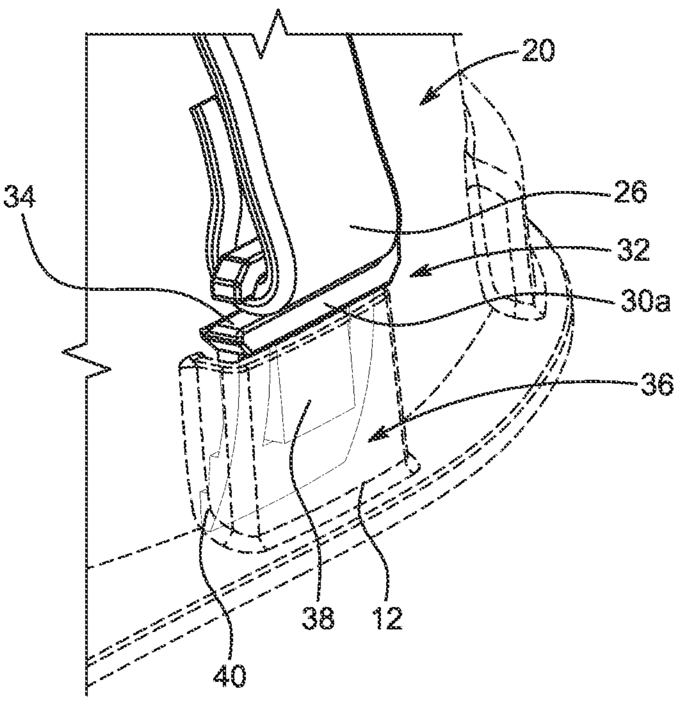
FIGS. 3 and 4 are perspective views of a first clip for an attachment device according to the present disclosure.
Figure 4:
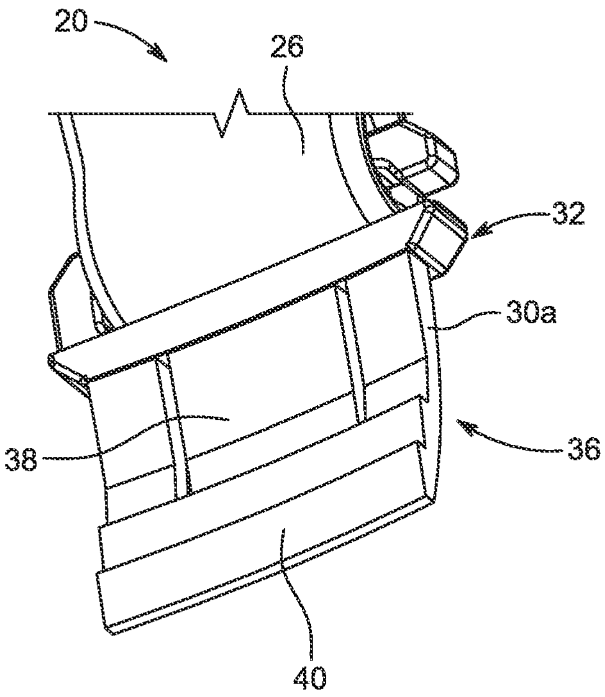

As best shown in FIGS. 3 and 4, the clip **30*a*—which should be understood to be identical to clip 30*b*—comprises an upper portion 32 including a strap slot 34 and a lower portion 36 including a depressible portion 38 and a stepped portion 40. In this embodiment, the strap slot 34 has an open side to allow for sliding of either of the fixed loops 24,26 of the strap 22 therein, so that the clip 30*a* can be quickly installed on or removed from the strap 22, for example to permit a different type of clip to be installed onto the strap 22, as will be further discussed below. In alternative embodiments, the clips 30*a*, 30*b* could be permanently installed onto the strap 22 in a way that does not permit replacement of the clips 30*a*,30*b*** with other types of clips.

Figure 2:
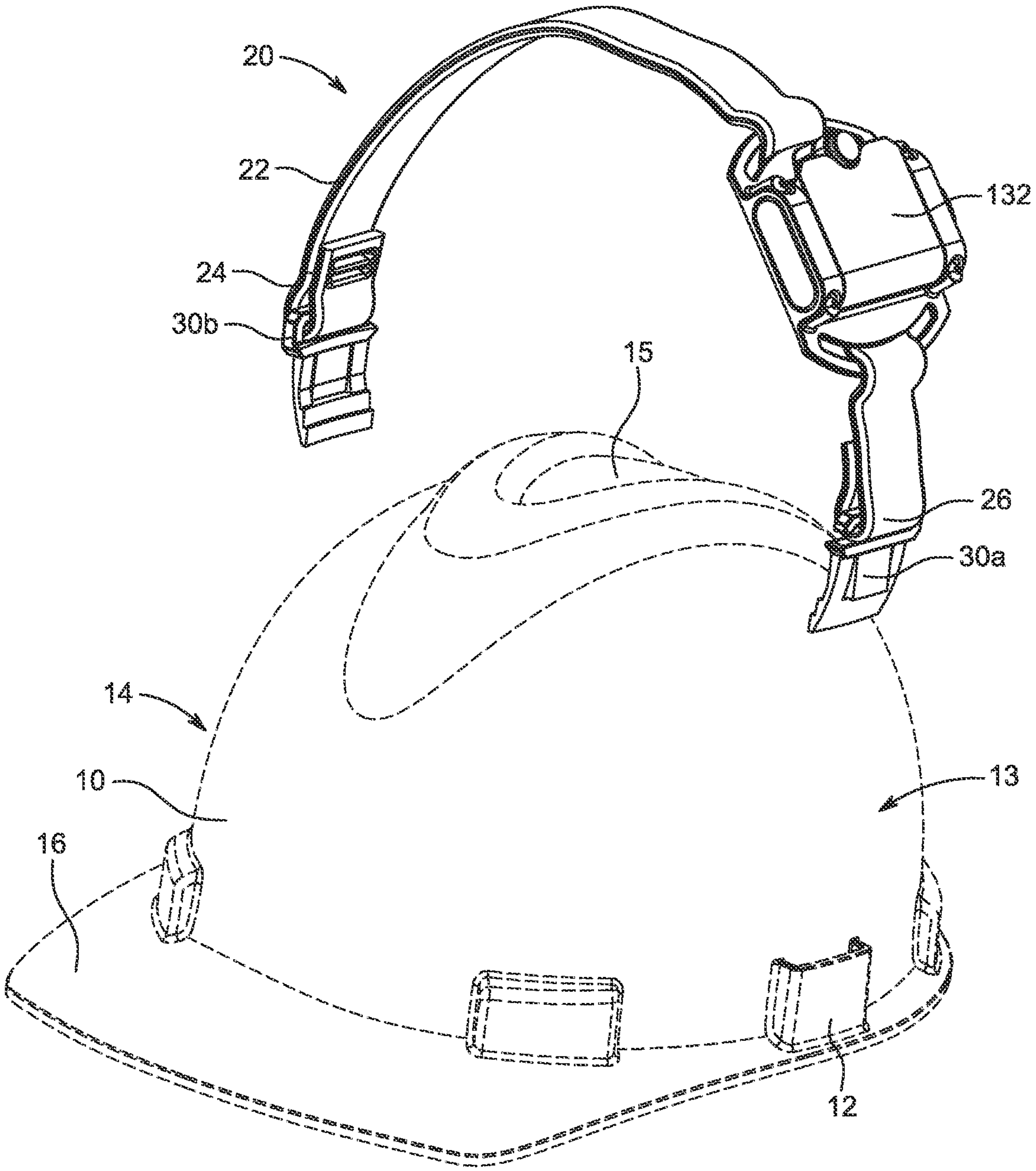
FIG. 2 is a perspective view thereof in a detached configuration with respect to the first exemplary helmet.

Referring back to FIGS. 3 and 4, in this embodiment the stepped portion 40 is sized and shaped to releasably engage with a slot (not labeled) present in the attachment portion 12 of the helmet 10. Slotted helmets like the type shown in FIGS. 1-3 are known in the art. Nonetheless, for ease of illustration, the helmet 10—including the attachment portion 12—has been rendered transparent in FIG. 3. The lower portion 36 of the clip 30*a* is installed within the attachment portion 12 of the helmet 10 by pressing the clip 30*a* downwardly into the attachment portion 12 until the stepped portion 40 rides over the slot in the helmet 10 until it is located below the slot in the helmet 10, and then clicks into place. The lower portion 36 of the clip 30*a* is permitted to partially deform via the gaps (not labeled) surrounding the depressible portion 38. The lower portion 36 of the clip 30*a* is then releasable from the attachment portion 12 of the helmet 10 by pressing on the depressible portion 38 of the clip 30*a* from the interior side thereof until the stepped portion 40 is clear of the slot in the helmet 10, and then pulling the clip 30*a* upwardly out of the attachment portion 12.

Figure 5:
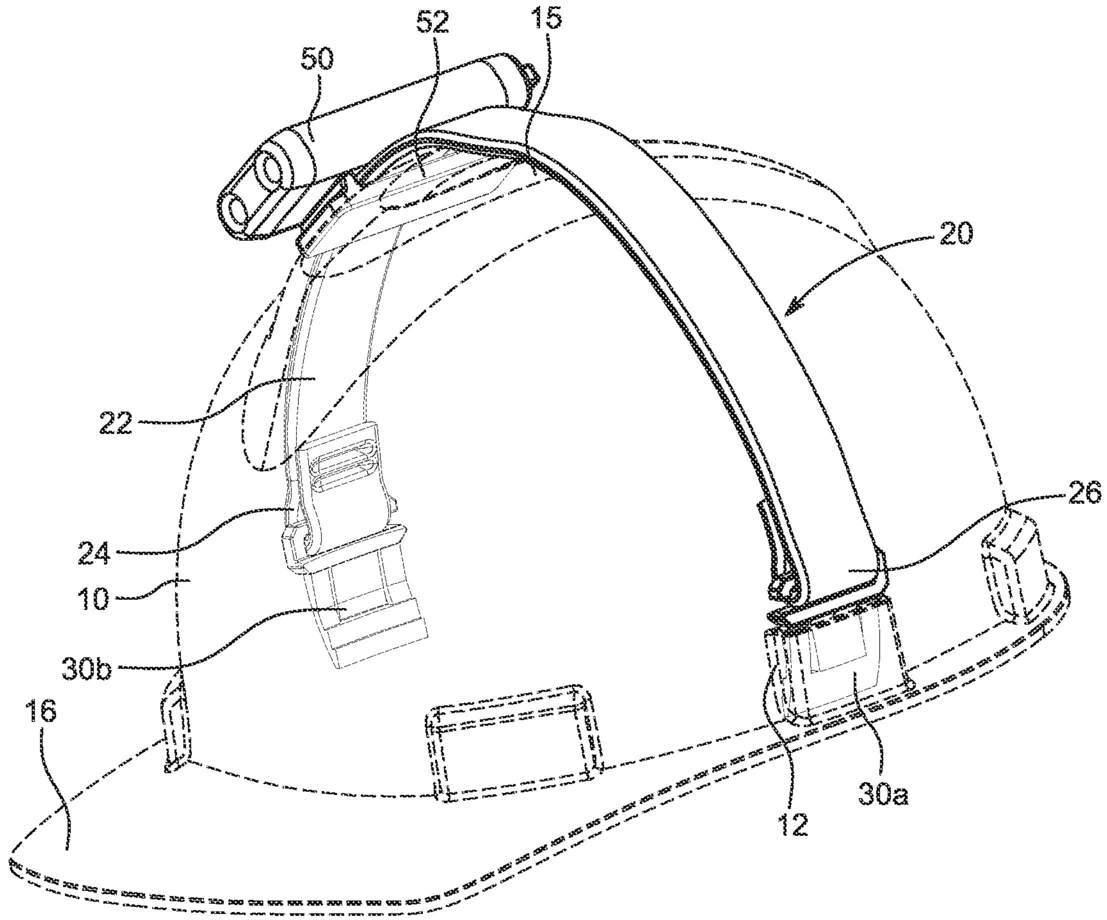
FIG. 5 is a perspective view of the helmet attachment device according to the present disclosure, shown in an attached configuration with respect to the first exemplary helmet, and including a second embodiment of a lighting device attached thereto.
Figure 18:
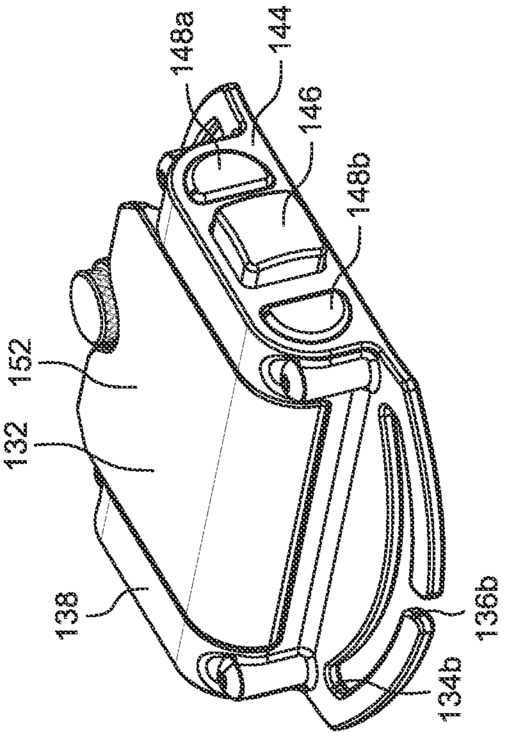
FIGS. 17 and 18 are perspective views of a first lighting device according to the present disclosure.
Figure 17:
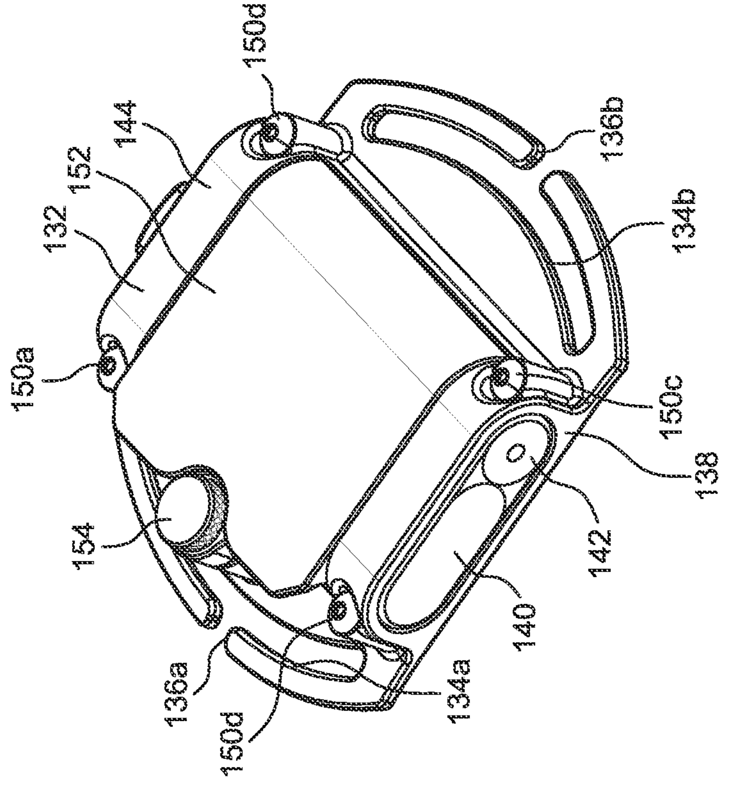
Figure 21:
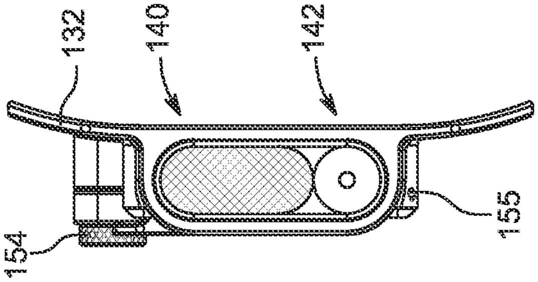
FIG. 21 is a second side view thereof.
Figure 20:
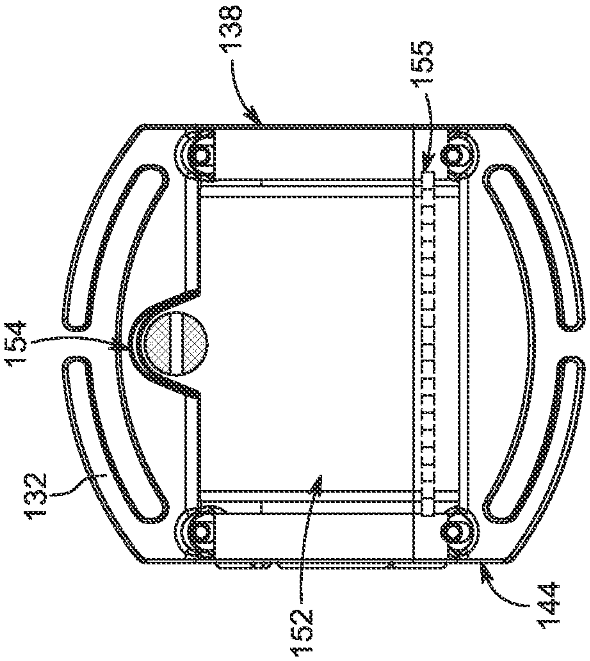
FIG. 20 is a rear view thereof.
Figure 19:
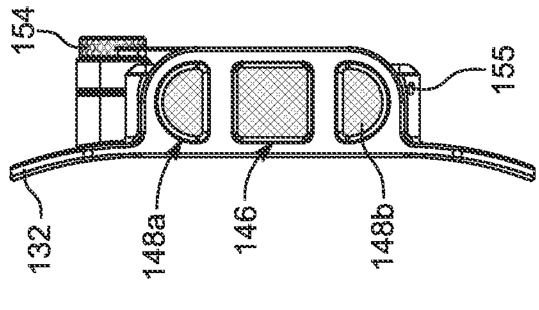
FIG. 19 is a first side view thereof.

A first embodiment of a lighting device 132—which will be described in further detail below—is shown attached to the strap 22 in FIG. 1. With reference to FIGS. 17 and 18, the lighting device 132 comprises strap slot 134*a* having gap 136*a* and strap slot 134*b* having gap 136*b*. The gaps 136*a*, 136*b* allow for the strap 22 to be releasably secured within the strap slots 134*a*, 134*b* such that the strap 22 is routed either atop or below the lighting device 132 to hold the lighting device 132 in place on the strap 22. FIG. 5 shows a second embodiment of a lighting device 50 that is attached to the strap 22 of the helmet attachment device 20 via a clip 52. It should be understood that any number of mechanisms could be used to attach any lighting device to the helmet attachment devices shown and discussed herein, including but not limited to various slots, clips, clamps, brackets, or fasteners. Once the lighting device 132 is attached to a helmet or other item, the arcuate curvature of the slots 134*a*, 134*b* allows for the lighting device 132 to be partially rotated to aim the lighting device 132 as desired.

Referring now to FIGS. 6-10, another embodiment of a helmet attachment device 64 according to the present disclosure will be described in detail. In this embodiment, the helmet attachment device 64 comprises a strap 66 and a pair of clips 80*a*, 80*b*. In this embodiment, the strap 66 includes a fixed loop 70 at one end thereof and an adjustable loop 72 at the opposite end thereof. The length of the strap 66 is adjustable via the buckle 68 in a known manner.

In this embodiment, the helmet attachment device 64 is shown attached to a second type of helmet 54, i.e., a fireman's helmet. The helmet 54 has a first lateral side 56 including a first attachment portion 55 (which in this case is a portion of the brim thereof, which extends around the entire perimeter of the helmet 54) and a second lateral side 57 including a second attachment portion (which in this case is a separate portion of the brim 55).

The helmet 54 further comprises an apex 58, an identification surface 62 on the front side thereof (where fire company information is typically displayed), and a ridge 60 that extends forwardly between the apex 58 and the identification surface 62. In this embodiment, the helmet attachment device 64 is further provided with a strap holder 74. The strap holder 74 has a ridge support 76 that fits snugly onto the ridge 60 of the helmet 54 and a pair of strap slots 78*a*, 78*b* through which the strap 66 is routed. The strap holder 74 holds the strap 66 in the desired location on the ridge 60 of the helmet 54, near the apex 58, while minimizing the potential for damage to the strap 66. The strap holder 74 also assists in keeping the clips 80*a*, 80*b* relatively fixed in place along the brim 55, i.e., minimizes front-to-back sliding thereof.

In this embodiment, both of the clips 80*a*, 80*b* are releasably attachable to the attachment portion (brim) 55 on, respectively, the first lateral side 56 and second lateral side 57 of the helmet 54. When both clips 80*a*, 80*b* are attached to the helmet 54 in this way, the strap 66 is routed over or near the apex 58 of the helmet 54, which allows for a lighting device (e.g., lighting device 132 or lighting device 50) to be attached to the strap 66 anywhere along the length of the strap 66, including in a location at or near the apex 58 of the helmet 54.

Figure 9:
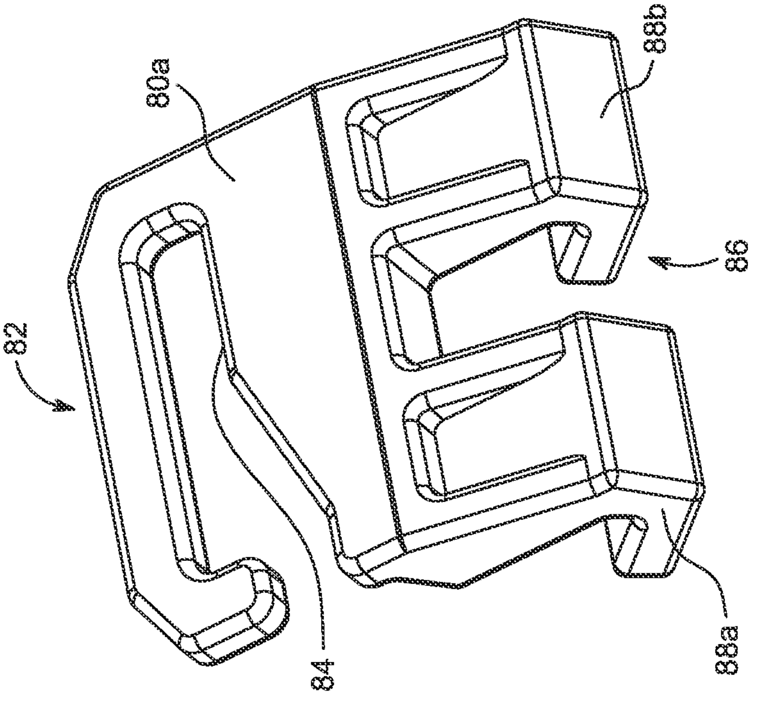

As best shown in FIGS. 9 and 10, the clip 80*a*—which should be understood to be identical to clip 80*b*—comprises an upper portion 82 including a strap slot 84 and a lower portion 86 including a pair of hooked portions 88*a*,88*b*. In this embodiment, the strap slot 84 has an open side to allow for sliding of either of the fixed loop 70 or the adjustable loop 72 of the strap 66 therein, so that the clip 80*a* can be quickly installed on or removed from the strap 66, for example to permit a different type of clip to be installed onto the strap 66, as will be further discussed below. In alternative embodiments, the clips 80*a*, 80*b* could be permanently installed onto the strap 66 in a way that does not permit replacement of the clips 80*a*, 80*b* with other types of clips.

Referring back to FIGS. 9 and 10, in this embodiment the hooked portions 88*a*, 88*b* are sized and shaped to releasably engage with the brim (attachment portion) 55 of the helmet 54 via the inside surfaces of the hooked portions 88*a*, 88*b* hooking around and applying pressure to the brim 55 via the elastic, restorative forces that will be applied to the clips 80*a*, 80*b* by the strap 66. Installation of the clips 80*a*, 80*b* onto the brim 55 occurs by stretching the strap 66 such that the clips 80*a*, 80*b* are aligned with the brim 55 on both lateral sides 56,57 and then releasing the clips 80*a*, 80*b* in place, and removal occurs by stretching the strap 66 such that the clips 80*a*, 80*b* are no longer aligned with the brim 55 before the strap 66 is released.

Referring now to FIGS. 11-13, another embodiment of a helmet attachment device 100 according to the present disclosure will be described in detail. In this embodiment, the helmet attachment device 100 comprises a strap 102 and a pair of clips (only one clip, clip 106, is shown in the Figures). In this embodiment, the strap 102 includes two fixed loops (only one fixed loop, fixed loop 104, is shown in the Figures), and therefore the length of the strap 102 is fixed.

In this embodiment, the helmet attachment device 100 is shown attached to a third type of helmet 92, i.e., a military helmet of known type. The helmet 92 has a first lateral side 94 including a first attachment portion 98—which in this case is an accessory slot—and a second lateral side 95 including a second attachment portion, i.e., a second accessory slot that is identical to the accessory slot found on the first lateral side 94. The first attachment portion 98 (accessory slot) includes an opening 99 located towards the front side thereof. The helmet 92 further comprises an apex 93 and an accessory bracket 96 located on the front side thereof for holding additional accessories therefrom (for example a visor or night-vision goggles).

As best shown in FIGS. 12 and 13, the clip 106 comprises an upper portion 108 including a strap slot 110 and a lower portion 112 including a slot-engagement portion 114. In this embodiment, the clip 106 is releasably attachable to the attachment portion (accessory slot) 98 on the first lateral side

94 of the helmet 92 by placing the slot-engagement portion 114 into the opening 99 and then sliding it further into the accessory slot 98. Removal of the clip 106 from the accessory slot 98 occurs in a reverse manner. When clips (including clip 106) are attached to the helmet 92 in this way with the strap 102 attached thereto, the strap 102 is routed over or near the apex 93 of the helmet 92, which allows for a lighting device (e.g., lighting device 132 or lighting device 50) to be attached to the strap 102 anywhere along the length of the strap 102, including in a location at or near the apex 93 of the helmet 92.

In this embodiment, the strap slot 110 has an open side to allow for sliding of either of the fixed loops (e.g., fixed loop 104) therein, so that the clip 106 can be quickly installed on or removed from the strap 102, for example to permit a different type of clip to be installed onto the strap 102, as will be further discussed below. In alternative embodiments, the clips (including clip 106) could be permanently installed onto the strap 102 in a way that does not permit replacement of the clips (including clip 106) with other types of clips.

Figure 14:
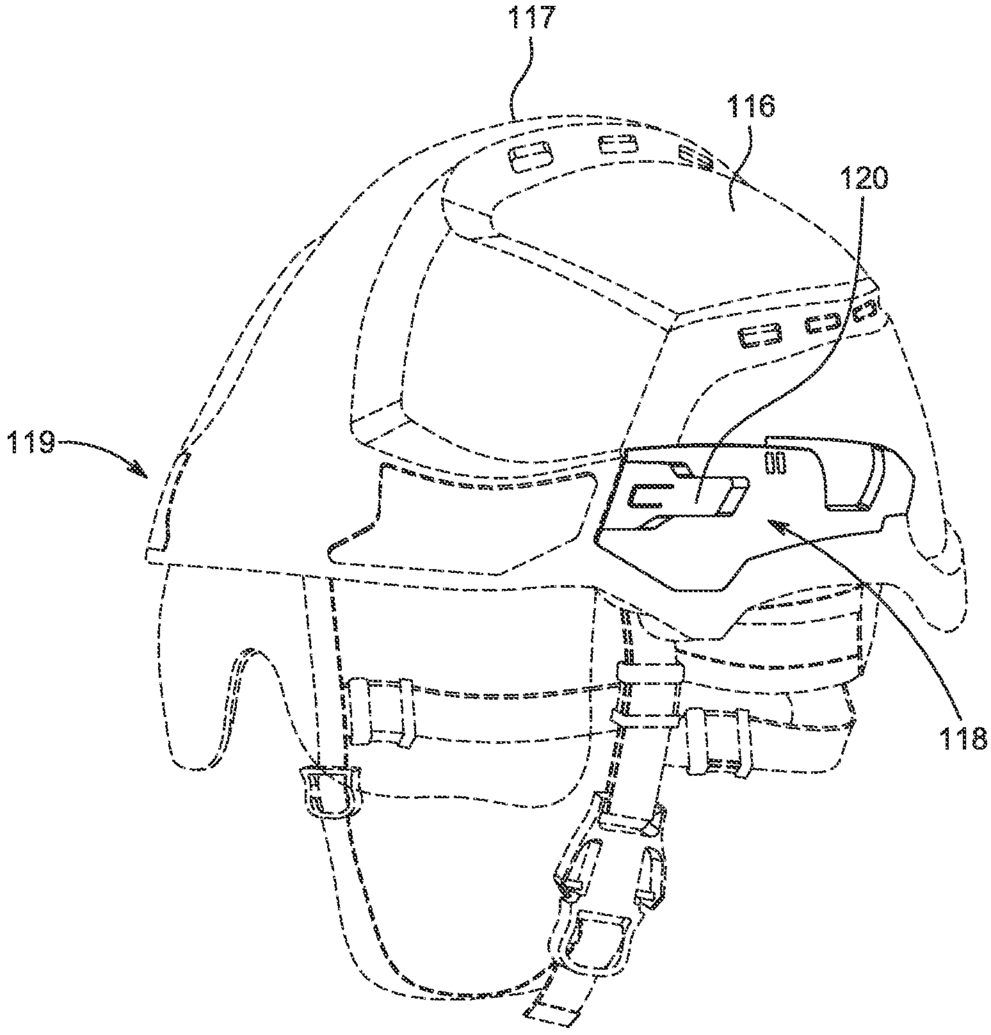
FIG. 14 is a perspective view of a fourth exemplary helmet to which an attachment device according to the present disclosure can be attached.

Referring now to FIG. 14, a fourth type of helmet 116, i.e., a known type of rescue helmet sold under the trademark MSA Gallet by Hobrand BV of The Netherlands, will be described in detail. The helmet has a first lateral side 118 including a first attachment portion 120—which in this case is an accessory slot—and a second lateral side 119 including a second attachment portion, i.e., a second accessory slot that is identical to the accessory slot found on the first lateral side 118. Various accessories may be releasably secured in the first attachment portion (accessory slot) 120, as would be understood by one having ordinary skill in the art. The helmet 116 further comprises an apex 117. For ease of discussion, only the first attachment portion/accessory slot 120 of the helmet 116 is shown in solid lines in FIG. 14.

Figure 16:
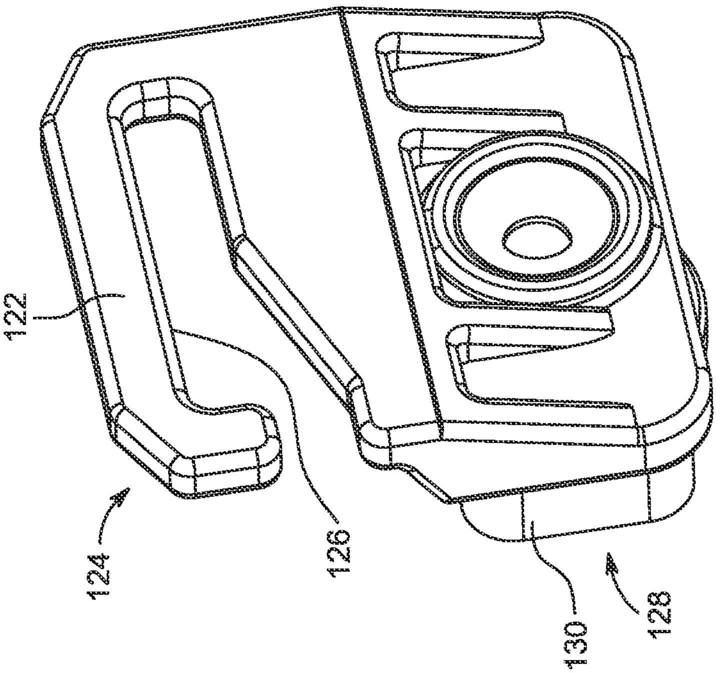
FIGS. 15 and 16 are perspective views of a fourth clip for an attachment device according to the present disclosure.
Figure 15:
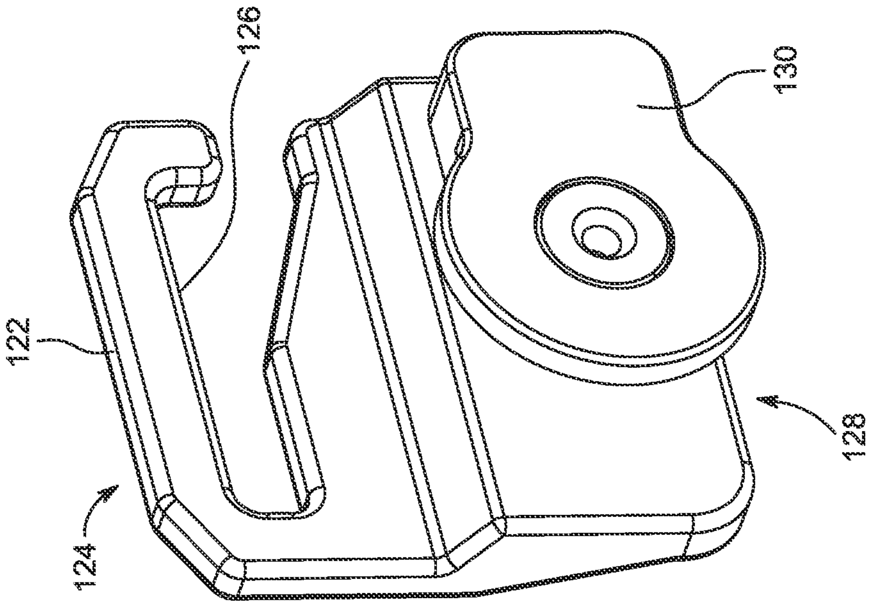

As shown in FIGS. 15 and 16, a clip 122 can be provided as part of a helmet attachment device or kit according to the present disclosure that will releasably engage with the attachment portion (accessory slot) 120 of the helmet 116. In this embodiment, the clip 122 comprises an upper portion 124 including a strap slot 126 and a lower portion 128 including a slot-engagement portion 130. The clip 122 is releasably attachable to the attachment portion (accessory slot) 120 on the first lateral side 118 of the helmet 116 by pressing the slot-engagement portion 130 downwardly into the attachment portion (accessory slot) 120. Removal of the clip 122 from the attachment portion (accessory slot) 120 occurs by pressing on a portion of the slot-engagement portion 130 from the inside of the helmet 116 and then pulling upwardly on the clip 122. When clips (including clip 122) are attached to the helmet 116 in this way with a strap (e.g., strap 22, strap 66, or strap 102) attached thereto, the strap is routed over or near the apex 117 of the helmet 116, which allows for a lighting device (e.g., lighting device 132 or lighting device 50) to be attached to the strap anywhere along the length thereof, including in a location at or near the apex 117 of the helmet 116.

FIGS. 17-21 show various images of the lighting device 132 shown in FIGS. 1 and 2. In addition to the strap slots 134*a*, 134*b* discussed above, the lighting device 132 comprises a front PCB cover 138 that contains a printed circuit board (PCB) that controls a flood lens 140 and spot lens 142 located on the front side of the lighting device 132, a battery door 152 which contains and conceals one or more batteries (e.g., Lithium rechargeable or one or more replaceable batteries) and which is held in place by a thumb screw 154, and a rear PCB cover 144 that contains a PCB that controls a button 146 and a pair of tail lights 148*a*, 148*b*. The button 146 can be used to switch between spot and flood light modes (i.e., via alternation between the flood lens 140 and the spot lens 142), change the intensity of those lights, and/or turn the tail lights 148*a*, 148*b* on and off. In some embodiments the tail lights 148*a*, 148*b* are constantly on when either of the spot lens 142 or the flood lens 140 is turned on, and in alternative embodiments the user may have the option whether to use the tail lights 148*a*, 148*b*. In some embodiments, the tail lights 148*a*, 148*b* emit a blue light, and are used for user location and identification from the rear in low-visibility (e.g., dark, smoky, and/or foggy) environments. As further shown in the schematic drawings of FIGS. 19-21, a hinge pin 155 for opening and closing the battery door 152 is routed through the battery door 152 and held in place by the front PCB cover 138 and rear PCB cover 144. Fasteners 150*a*, 150*b* are used to hold the rear PCB cover 144 in place and fasteners 150*c*, 150*d* are used to hold the front PCB cover 138 in place.

Figure 6:
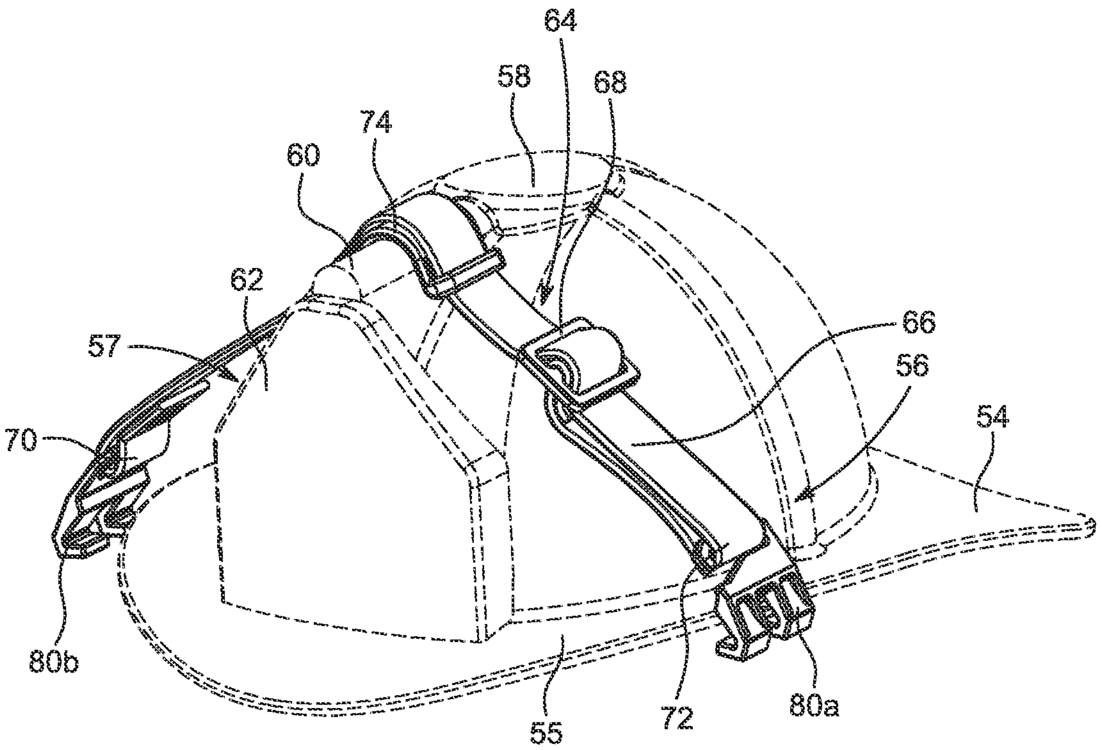
FIG. 6 is a perspective view of a third helmet attachment device according to the present disclosure, shown in an attached configuration with respect to a second exemplary helmet.
Figure 7:
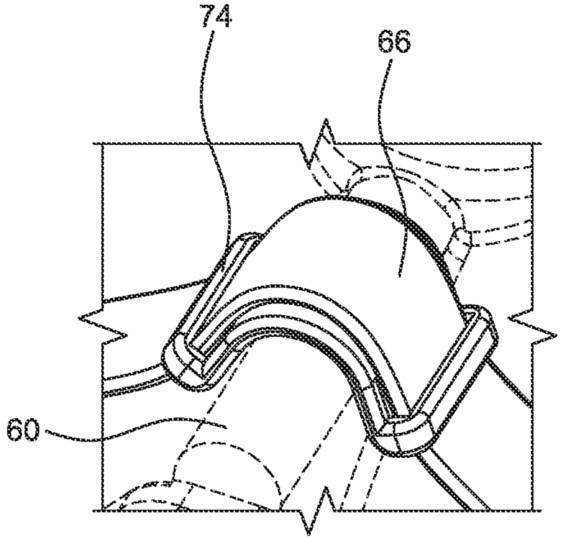
FIGS. 7 and 8 are perspective views of a strap holder component of the third helmet attachment device.
Figure 8:
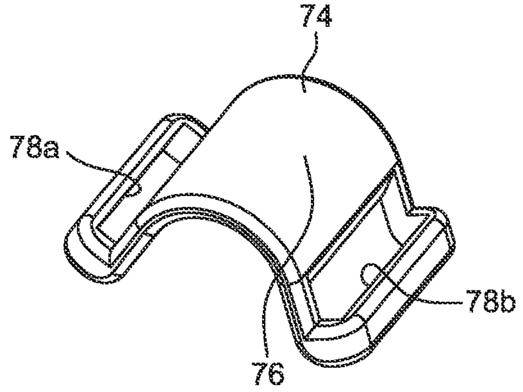
Figure 22:
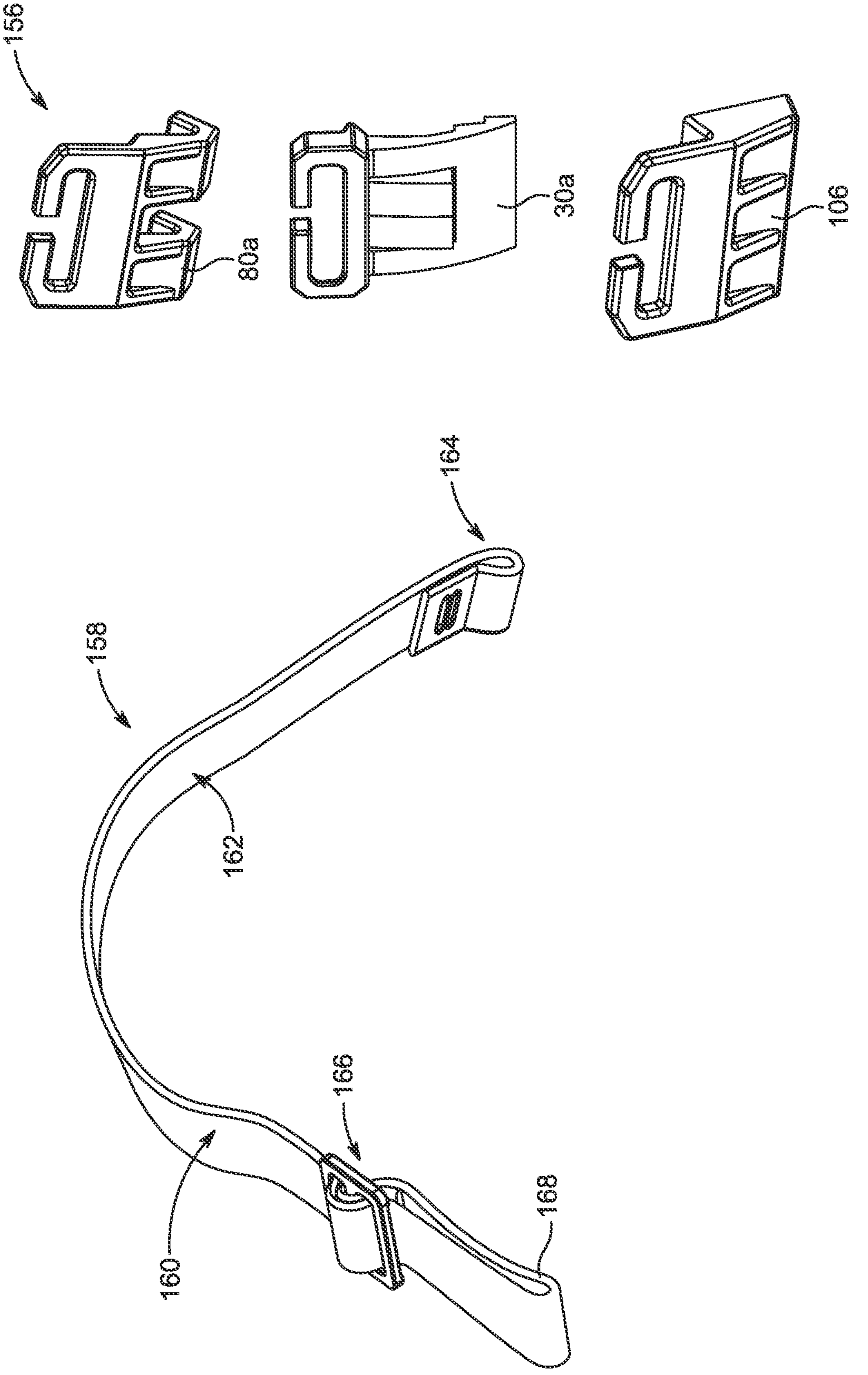
FIG. 22 is a schematic view of a kit for attachment to a helmet comprising a strap and a plurality of clips according to the present disclosure.

With reference now to the schematic diagram of FIG. 22, in some iterations the helmet attachment device according to the present disclosure can be provided as a kit 156 comprising one or more straps and multiple pairs of clips, for example: a pair of "over the brim" clips 80*a*, 80*b* as shown in FIGS. 6, 9, and 10; a pair of "accessory slot" clips 30*a*,30*b* as shown in FIGS. 1-5; a pair of "accessory rail" clips 106 as shown in FIGS. 11-13; and/or a pair of "accessory slot" clips 122 as shown in FIGS. 15 and 16. The various pairs of clips may be alternatively attached to the strap to allow for attachment to multiple different types of helmet out of the box. The kit 156 may further include a fixed length strap (such as strap 22 of FIGS. 1, 2, and 5 or strap 102 of FIG. 11), an adjustable length strap (such as strap 66 of FIGS. 6 and 7 or strap 158 of FIG. 22), two fixed length straps of different lengths, or both of a fixed length strap and an adjustable length strap. As further shown in FIG. 22, the strap 158 may be comprised of an elastic fabric material, have an exterior side 160 that is uncoated (or covered in a silicone material), and have an interior side 162 that is covered in a silicone material for increased gripping on helmet materials. The strap 158 may further comprise a "tri-glide" buckle 166 of known type for length adjustment and two loops: an adjustable length loop 168 and a fixed loop 164, which in this embodiment is sewn. Kits according to the present disclosure could also be sold with one or more units of any of the lighting devices discussed herein, or any other lighting devices that are attachable to a strap.

Figure 23:
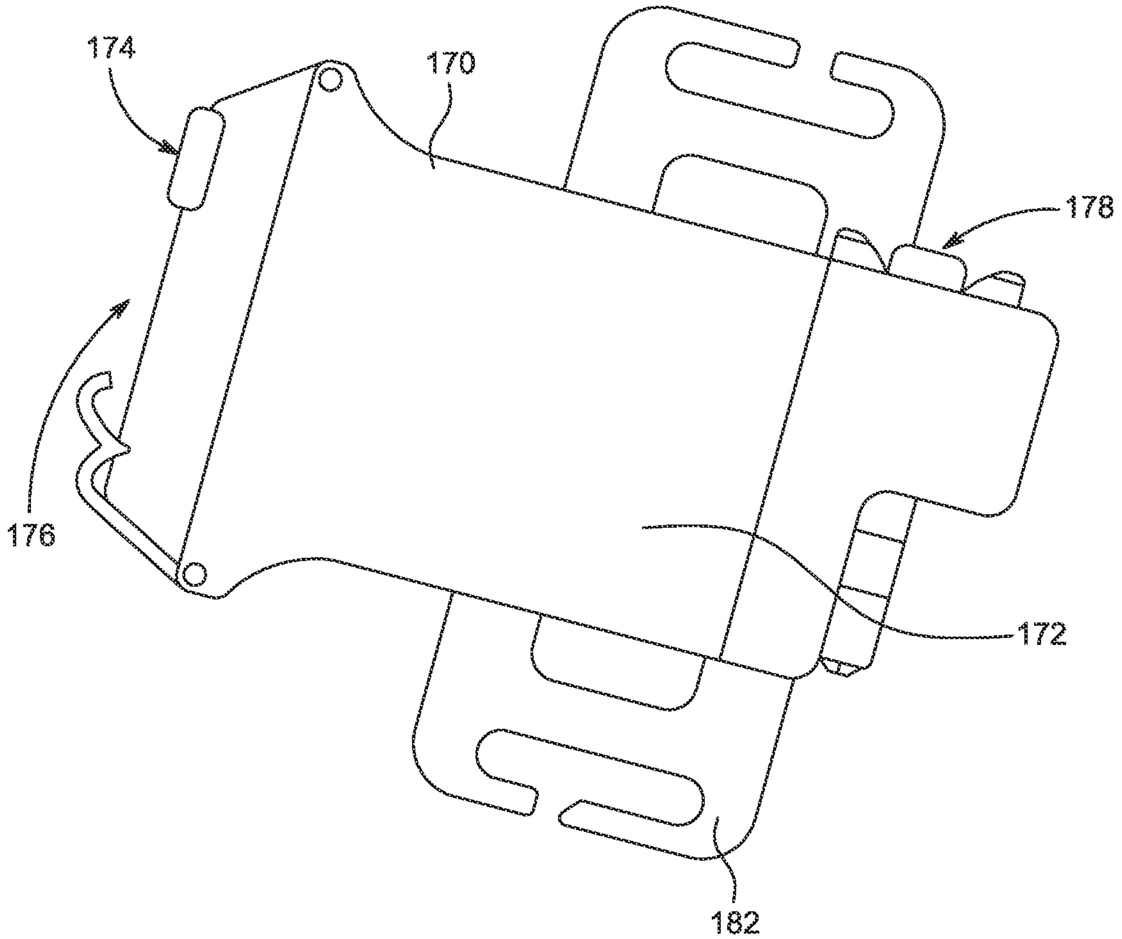
FIG. 23 is a side view of a lighting device and clip for attachment to a helmet, according to the present disclosure.
Figure 24:
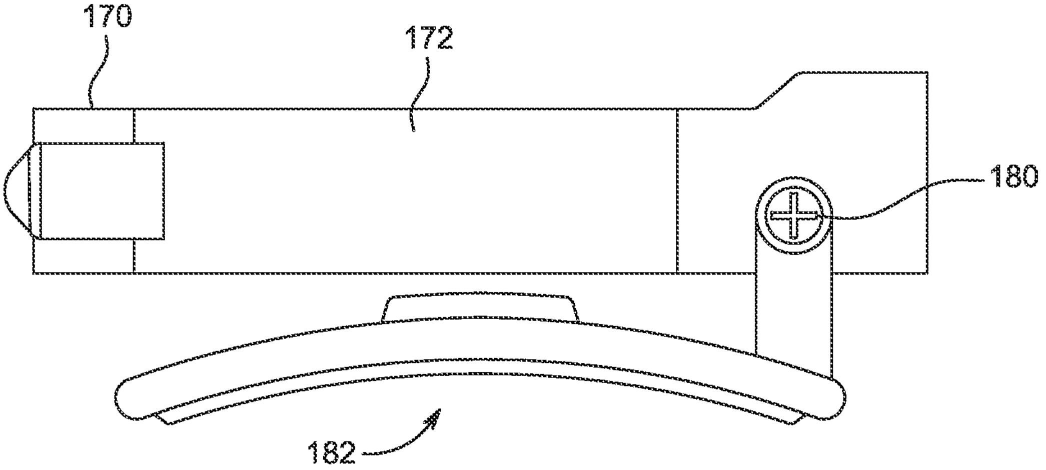
FIG. 24 is a bottom view thereof.

An additional embodiment of a lighting device 170 that may be sold together with one or more strap(s) and/or pair(s) of clips according to the present disclosure is shown schematically in FIGS. 23 and 24. In this embodiment, the lighting device 170 comprises a body 172 (which in this embodiment may be made of extruded aluminum) attached to a clip 182 that is adapted to attach to a strap or, alternatively, directly to a hat. In this embodiment the body 172 is attached to the clip 182 via a tilt hinge 180 that allows for the user to make fine windage or angle adjustments to the body 172 to achieve the desired angle for the light that is emitted therefrom. Such a hinge may also be provided in the lighting device 50 of FIG. 5. Turning back to the lighting device of FIGS. 23 and 24, the body 172 further comprises a button 178 that acts as an ON/OFF and mode selection switch, a battery door with latch 176 for concealing one or more rechargeable or replaceable batteries, and a tail light 174 (which in this embodiment may also be blue color for low-light user visibility from the rear).

Figure 25:
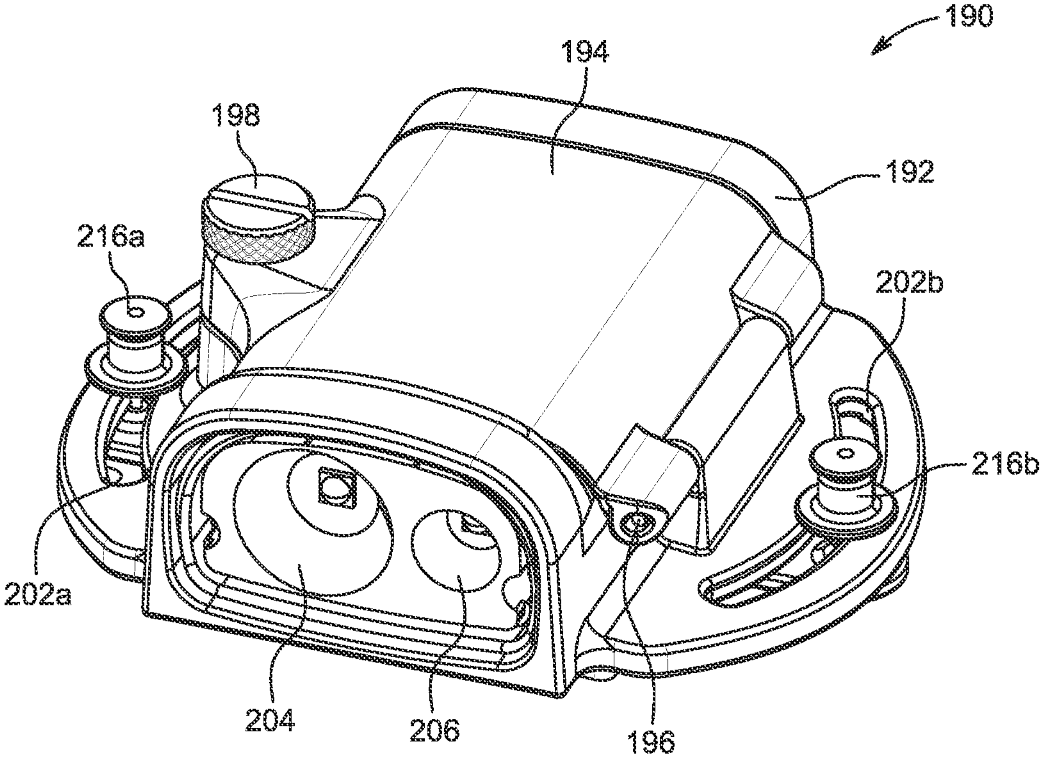
FIG. 25 shows a front and top perspective view of another embodiment of a lighting device according to the present disclosure.
Figure 26:
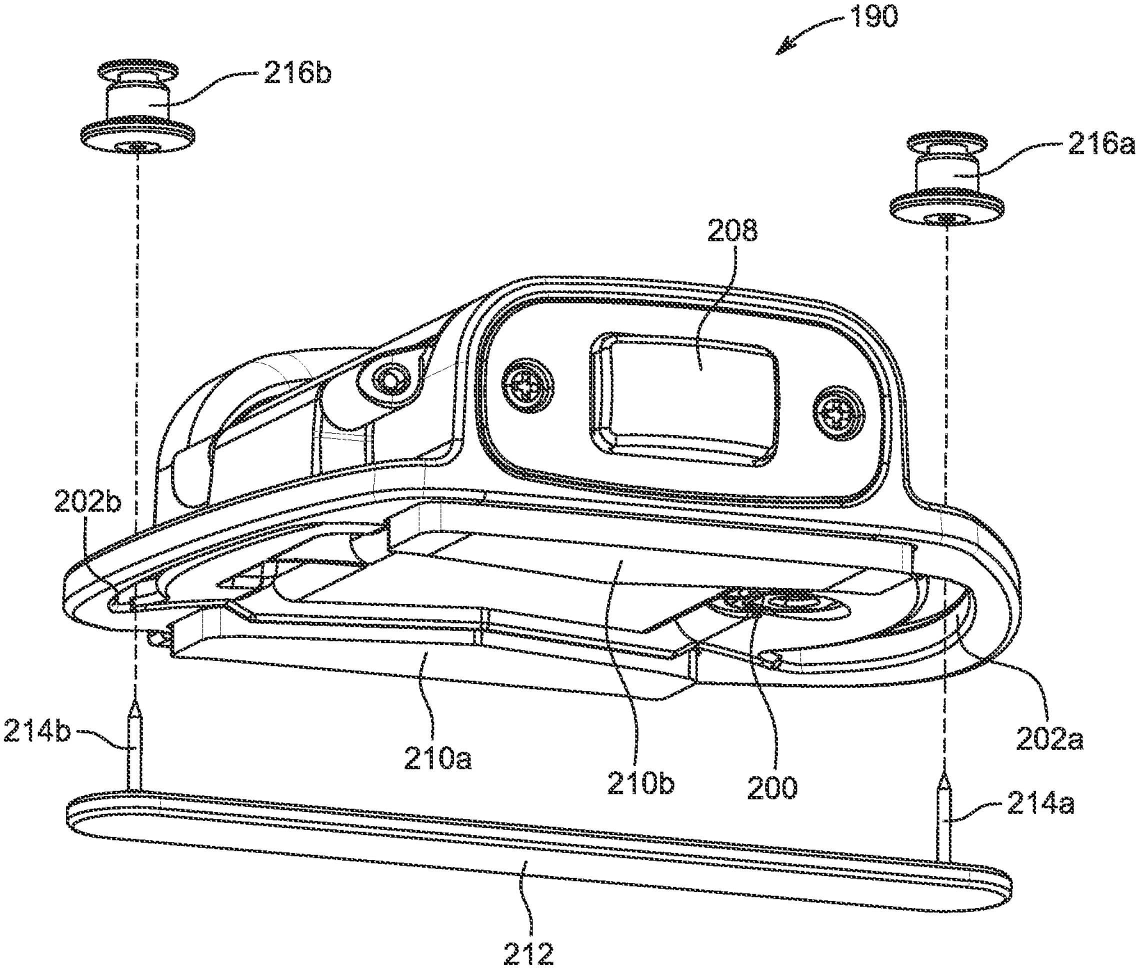
FIG. 26 shows a rear, bottom, partially-exploded perspective view thereof.

With reference now to FIGS. 25 and 26, another embodiment of a lighting device 190 will be described in detail, with FIG. 25 showing a front, top perspective view and FIG. 26 showing a rear, bottom, partially-exploded perspective view thereof. In this embodiment, the lighting device 190 uses disposable batteries (e.g., 3× “AAA”-size batteries) and comprises a body 192 that conceals the PCB (not shown) and a battery door 194 that is attached to the body 192 via a hinge pin 196 to conceal a battery compartment (not shown) where the disposable batteries are contained. The battery door 194 is held closed via a thumb screw 198 that threadedly engages with a nut 200 that is rotationally fixed on the underside of the body 192. The battery door 194 is thus openable by rotating the thumb screw 198 in an opposite direction until it disengages from the nut 200 such that the battery door 194 can be lifted away from the body 192.

Similar to other embodiments discussed above, the lighting device 190 comprises a pair of slots 202*a*,202*b* through which one or more strap(s) can be routed for holding the lighting device 190 in a desired location on an article of headwear, and similarly comprises a flood lens 204, a spot lens 206, and a button 208 that is used to switch between flood and spot modes and toggle the lighting device 190 between ON and OFF states. In this embodiment, the lighting device 190 further comprises a hat strap 212 that is used—as an alternative to the use of an attachment strap—to attach the lighting device 190 to a soft hat (e.g., a baseball-style cap) or any other item (e.g., an article of clothing or fabric) that is able to be punctured by the pins 214*a*, 214*b* located on the hat strap 212. As shown in FIG. 26, the hat strap 212 is fitted underneath the soft hat, the pins 214*a*,214*b* puncture through the hat, each pass through a respective one of the slots 202*a*, 202*b*, and are each capped with a respective pin cover 216*a*,216*b* that holds the lighting device 190 in place in a desired location while protecting the user from receiving an accidental injury from the pins 214*a*,214*b*. The underside of the body 192 further comprises pads 210*a*,210*b* to ensure user comfort. Moreover, once the lighting device 190 is attached to a hat or other item, the arcuate curvature of the slots 202*a*,202 allows for the lighting device 190 to be partially rotated to aim the lighting device 190 as desired.

Figure 27:
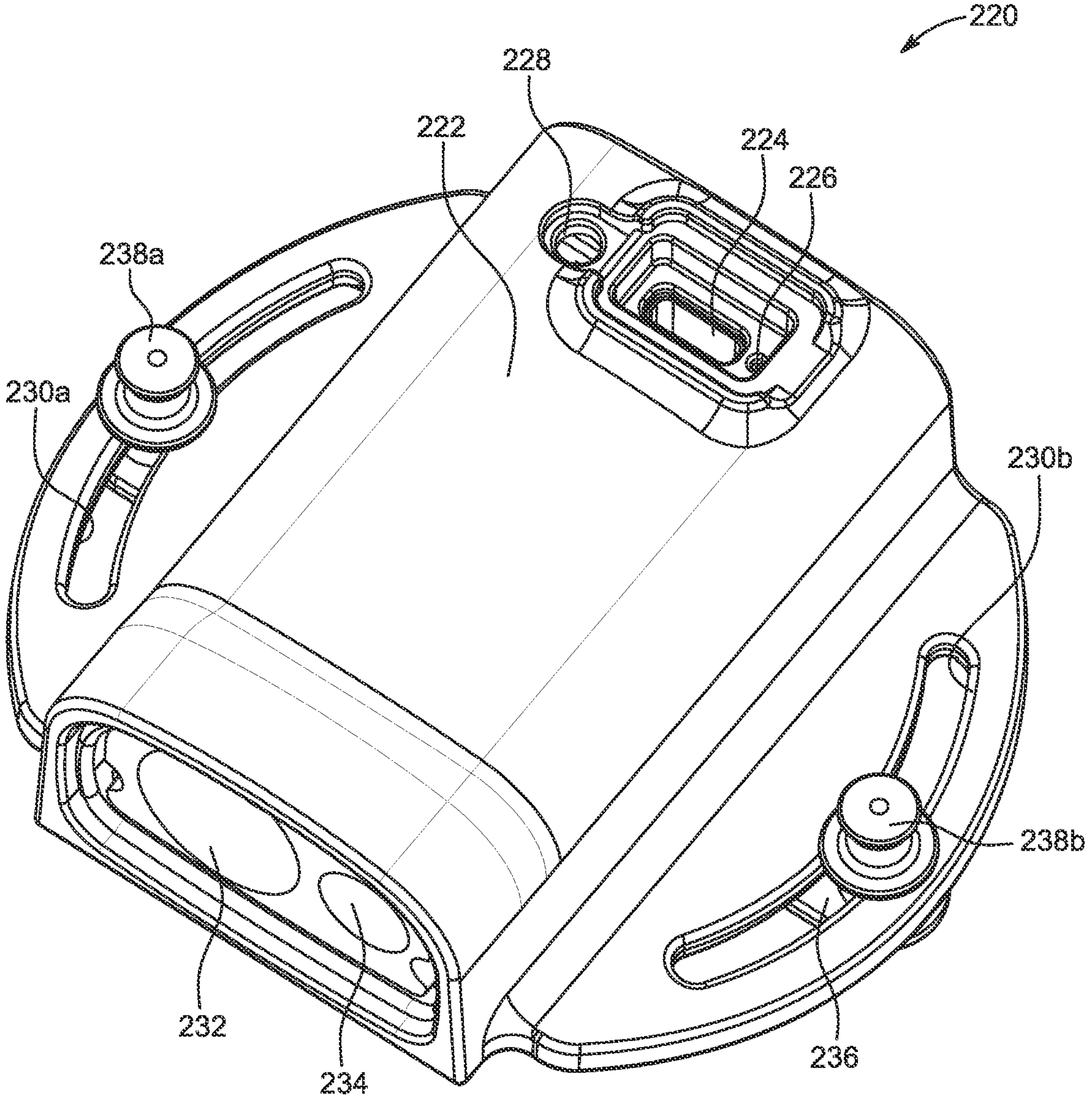
FIG. 27 shows a perspective view of yet another embodiment of a lighting device according to the present disclosure.

With reference to FIG. 27, another embodiment of a lighting device 220 will be described in detail. In this embodiment, the lighting device 220 uses a rechargeable battery and comprises a body 222 that conceals the PCB (not shown). In this embodiment, the lighting device 220 comprises a charging port 224 (e.g., a USB-C port), a light 226 that indicates charging status, and a cover (omitted from view in FIG. 27 for ease of discussion) which is attached to the body 222 via hole 228, the cover being used to cover the charging port 224 and protect it from, e.g., dirt, fluids, and damage Similar to other embodiments discussed above, the lighting device 220 comprises a pair of slots 230*a*,230*b* through which one or more strap(s) can be routed for holding the lighting device 220 in a desired location on an article of headwear, and similarly comprises a flood lens 232, a spot lens 234, and a button on its rear side (not shown) that is used to switch between flood and spot modes and toggle the lighting device 220 between ON and OFF states. In this embodiment, the lighting device 220 further comprises a hat strap 236 and pin covers 238*a* 238*b* that are structurally and functionally identical to the hat strap 212 used in the embodiment of FIGS. 25 and 26.

Applicant is further in possession of embodiments of the present disclosure in which any version of the lighting device can be affixed to an article of headwear, clothing, or other item via the use of hook-and-loop or other reclosable types of fastener, for example the Dual Lock™ reclosable fastener patch produced by 3M Company of Saint Paul, Minnesota, U.S.A. In any of the present embodiments, the lighting device(s) can be provided with the fastening mechanism either already pre-installed on the rear side thereof or provided separately within the package, and/or such a fastening mechanism could be included separately as part of a kit of parts including one or more strap(s), hook(s), and/or other attachment accessories as discussed herein.

It should be understood that any of the lighting devices according to the present disclosure could be provided with product specification such that it meets Class 1 Division 1 (C1D1) standards under the U.S. National Electric Code, meaning that it is safe to use in the continuous or frequent presence of flammable vapors or gases under normal operating conditions (i.e., is explosion proof in these conditions).

Figure 28:
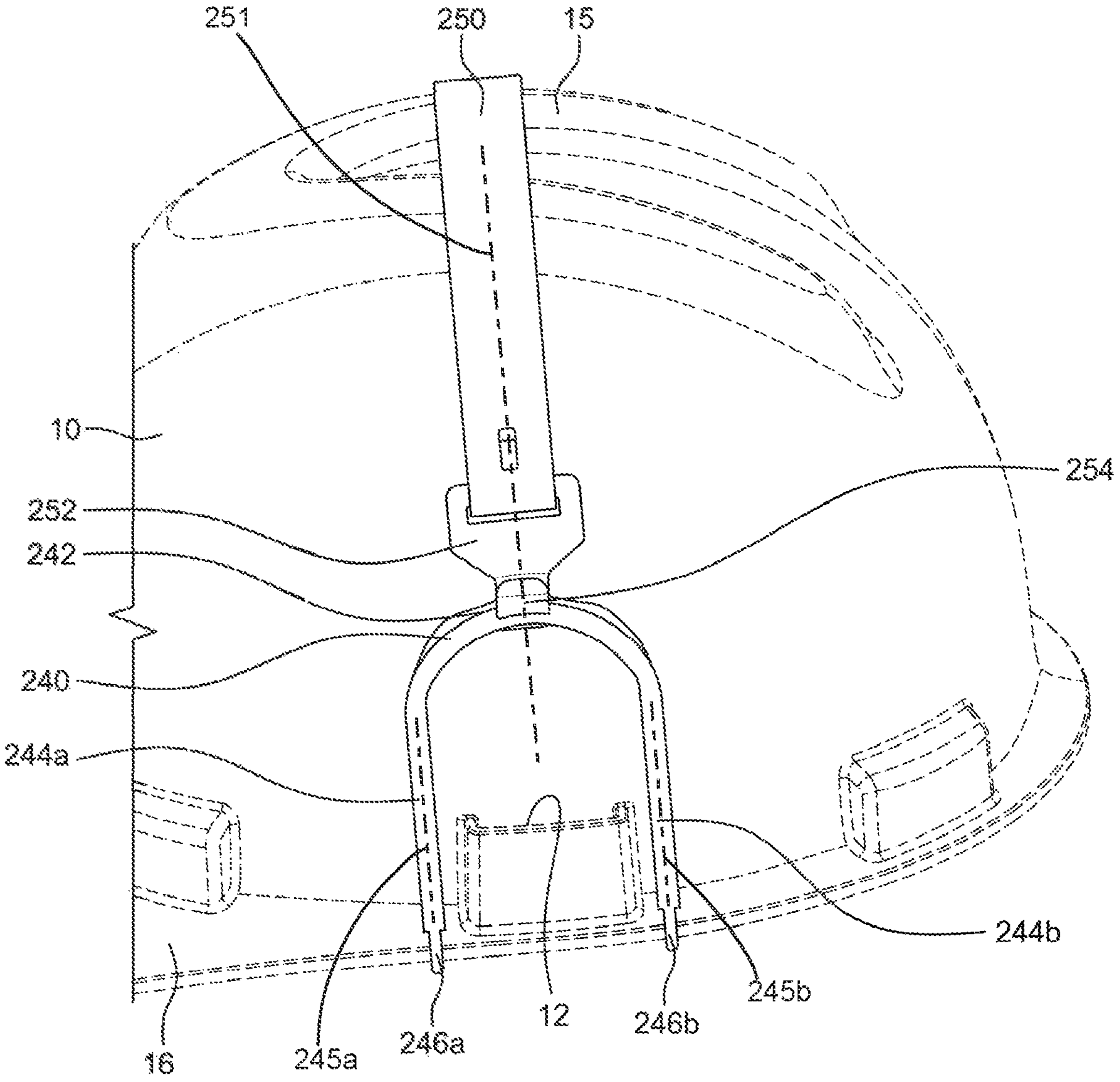
FIG. 28 shows another embodiment of an attachment device according to the present disclosure, shown attached to the exemplary helmet of FIGS. 1 and 2.

FIG. 28 shows another embodiment of an accessory for an attachment device comprising a pair of adapters (only one adapter 240 is shown in FIG. 28), each of which comprises a central portion 242 and a pair of arms 244*a*,244*b* that extend from the central portion 242 to form an overall “U” shape so that the arms 244*a*,244*b* are located in front of and behind the attachment portion 12, respectively. A respective hook 246*a*, 246*b* is located at the end of each arm 244*a*, 244*b*, the hooks 246*a*,246*b* being adapted to clamp around the brim of a helmet (e.g., brim 16 of hard hat 10). The adapter 240 includes a pair of wire form hoops to straddle around ear protection (or other accessory (-ies)) that may be attached to the helmet 10 via attachment portion 12 on one or both sides of the helmet 10. In this configuration, a strap (e.g., strap 250) extends over the apex 15 of the helmet 10 and is attached at both ends to clips (e.g., clip 252 having hooked portion 254), the hooked portion 254 of the clip 252 being adapted to attach to the central portion 242 of the adapter 240. The strap 250 has an axis 251 when attached across the apex 15 of the helmet 10 and the arms 244*a*,244*b* likewise have respective axes 245*a*,245*b*, and the axes 245*a*,245*b* are non-aligned with the axis 251 of the strap 250 to create “offset” attachment positions relative to the helmet 10 and its attachment portion 12. If no ear protection (or other accessory) is in use at either or both of the attachment portions (e.g., attachment portion 12), the adapter(s) 240 can be omitted and the strap hook(s) (e.g., hooked portion 254) can be attached directly to the brim 16 of the helmet 10. It should be understood that a pair of adapters 240 could, in the alternative, be provided permanently attached to a strap.

Figure 29:
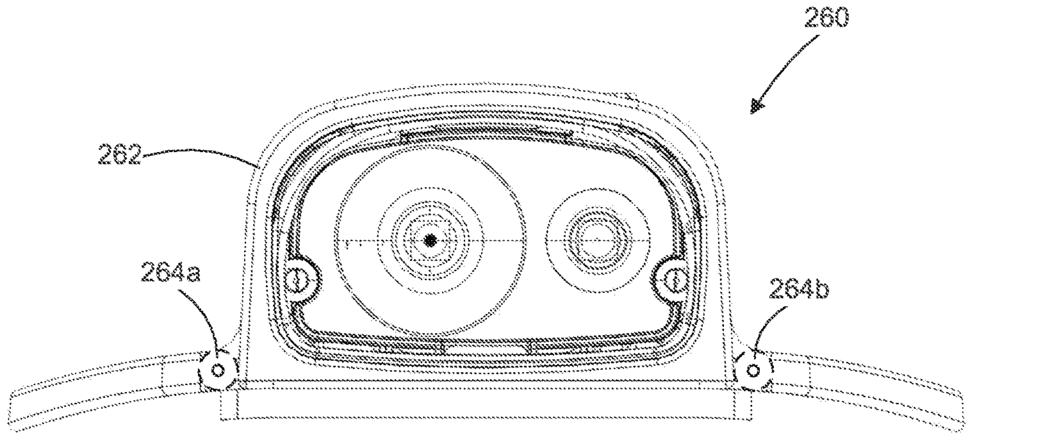
FIG. 29 shows a front view of another embodiment of a lighting device according to the present disclosure.
Figure 30:
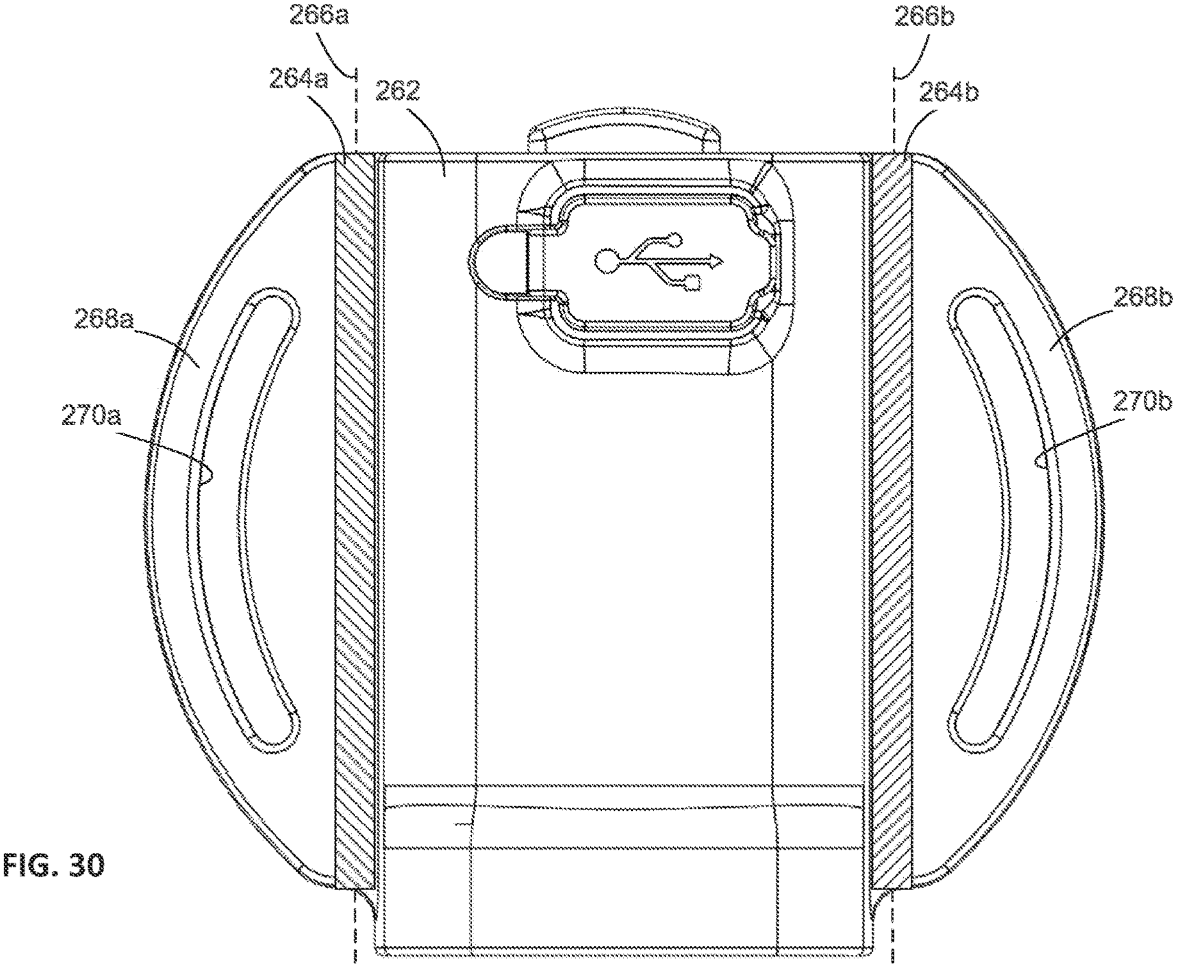
FIG. 30 is a top view thereof.

FIGS. 29 and 30 show another embodiment of a lighting device 260 according to the present disclosure that could be used along with any of the strap(s), clip(s), or other accessories disclosed herein. It should be understood that the present embodiment of a lighting device is substantially similar to the embodiment of a lighting device 220 shown in FIG. 27, and therefore that not all parts are labeled in FIGS. 29 and 30 for ease of discussion. Moreover, it should be understood that the modifications discussed below shown in the embodiment of FIGS. 29 and 30 could be adapted for use in any of the embodiments of a lighting device shown and described herein.

In this embodiment, the lighting device 260 comprises a body 262 and a pair of hinges 264*a*,264*b*—which are shown schematically in FIGS. 29 and 30—that each rotatably attach a respective one of a pair of side portions 268*a*,268*b* to the body 262 about a respective one of a pair of axes 266*a*,266*b*. It should be understood that any suitable type of hinge mechanism could be used for the hinges 264*a*,264*b*. Each of the side portions 268*a*,268*b* includes a respective slot 270*a*,270*b* for passage of a strap or other supporting mechanism as has been discussed above. In this embodiment, the freedom to adjust the angle of the side portions 268*a*,268*b* relative to the body 262 about the hinges 264*a*, 264*b* allows for the lighting device 260 to better conform to the curvature of a helmet, a user's head, or another irregular surface to which the lighting device 260 might be attached.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What is claimed is:

1. A helmet attachment device adapted to be mounted to a helmet, the helmet having a first attachment portion located on a first lateral side of the helmet and a second attachment portion located on a second lateral side of the helmet, the helmet further comprising an apex, the helmet attachment device comprising:

a strap, the strap having a first end and a second end;

a first clip attached to the first end of the strap, the first clip being specially adapted to attach to the first attachment portion;

a second clip attached to the second end of the strap, the second clip being specially adapted to attach to the second attachment portion; and a lighting device that is attachable to the strap, the lighting device comprising a first slot and a second slot through which the strap can be routed, wherein each of the first and second slots has an arcuate curvature, such that when the strap is routed through the first and second slots, the lighting device can be rotated relative to the strap;

wherein when the first clip is attached to the first attachment portion and the second clip is attached to the second attachment portion, the strap is routed over or near the apex of the helmet; and wherein, when the lighting device is attached to the strap, the lighting device is rotatable with respect to the helmet without repositioning the strap.

2. The helmet attachment device of claim 1, wherein the first and second clips each have at least one hooked portion.

3. The helmet attachment device of claim 1, wherein the first and second clips each have a portion that is adapted to releasably engage with an accessory slot or rail located on the helmet.

4. The helmet attachment device of claim 1, wherein the first and second clips each have a portion that is adapted to releasably engage with an accessory slot located on the helmet.

5. A helmet attachment device adapted to be mounted to a helmet, the helmet having a first attachment portion located on a first lateral side of the helmet and a second attachment portion located on a second lateral side of the helmet, the helmet further comprising an apex, the helmet attachment device comprising:

a strap, the strap having a first end, a second end, and an axis;

an adapter that is attachable to either of the first end or the second end of the strap, the adapter having a central portion, a first arm, and a second arm, the first arm extending from the central portion along a first axis and the second arm extending from the central portion along a second axis, each of the first and second axes being non-aligned with the axis of the strap, each of the first and second arms being adapted to attach to either of the first attachment portion or the second attachment portion;

a first clip attached to the first end of the strap, the first clip being specially adapted to attach to the first attachment portion;

a second clip attached to the second end of the strap, the second clip being specially adapted to attach to the second attachment portion; and a lighting device that is attachable to the strap;

wherein when the first clip is attached to the first attachment portion and the second clip is attached to the second attachment portion, the strap is routed over or near the apex of the helmet; and wherein, when the lighting device is attached to the strap, the lighting device is rotatable with respect to the helmet without repositioning the strap.

6. The helmet attachment device of claim 5, wherein the first arm comprises a first hook and the second arm comprises a second hook.

7. A kit comprising:

a strap, the strap having a first end and a second end;

a first clip that is removably attachable to the first end of the strap, the first clip being specially adapted to attach to a first attachment portion located on a first lateral side of a first type of helmet, the first type of helmet having an apex;

a second clip that is removably attachable to the second end of the strap, the second clip being specially adapted to attach to a second attachment portion located on a second lateral side of the first type of helmet;

a third clip that is removably attachable to the first end of the strap, the third clip being specially adapted to attach to a first attachment portion located on a first lateral side of a second type of helmet, the second type of helmet having an apex; and a fourth clip that is removably attachable to the second end of the strap, the fourth clip being specially adapted to attach to a second attachment portion located on a second lateral side of the second type of helmet;

wherein when the first clip is attached to the first end of the strap, the second clip is attached to the second end of the strap, the first clip is attached to the first attachment portion of the first type of helmet, and the second clip is attached to the second attachment portion of the first type of helmet, the strap is routed over or near the apex of the first type of helmet; and wherein when the third clip is attached to the first end of the strap, the fourth clip is attached to the second end of the strap, the third clip is attached to the first attachment portion of the second type of helmet, and the fourth clip is attached to the second attachment portion of the second type of helmet, the strap is routed over or near the apex of the second type of helmet.

8. The kit of claim 7, further comprising a lighting device that is attachable to the strap at or near the apex of the helmet.

9. The kit of claim 8, wherein the lighting device further comprises a first slot and a second slot through which the strap can be routed.

10. The kit of claim 9, wherein each of the first and second slots has an arcuate curvature, such that when the strap is routed through the first and second slots, the lighting device can be rotated relative to the strap.

11. The kit of claim 7, wherein the first and second clips each have at least one hooked portion.

12. The kit of claim 7, wherein the third and fourth clips each have a portion that is adapted to releasably engage with an accessory slot or rail located on the first lateral side or the second lateral side of the first type of helmet or the second type of helmet.

13. The kit of claim 11, wherein the third and fourth clips each have a portion that is adapted to releasably engage with an accessory slot or rail located on the first lateral side or the second lateral side of the first type of helmet or the second type of helmet.

14. The kit of claim 7, further comprising an adapter that is attachable to either of the first end or the second end of the strap, the adapter having a central portion, a first arm, and a second arm, the first arm extending from the central portion along a first axis and the second arm extending from the central portion along a second axis, each of the first and second axes being non-aligned with an axis of the strap, each of the first and second arms being adapted to attach to either of the first attachment portion or the second attachment portion.

15. The kit of claim 14, wherein the first arm comprises a first hook and the second arm comprises a second hook.

16. A helmet attachment device adapted to be mounted to a helmet, the helmet having a first attachment portion located on a first lateral side of the helmet and a second attachment portion located on a second lateral side of the helmet, the helmet further comprising an apex, the helmet attachment device comprising:

a strap, the strap having a first end and a second end;

a lighting device that is attachable to the strap, the lighting device further comprising a first slot and a second slot through which the strap can be routed;

a first clip attached to the first end of the strap, the first clip being specially adapted to attach to the first attachment portion; and a second clip attached to the second end of the strap, the second clip being specially adapted to attach to the second attachment portion;

wherein when the first clip is attached to the first attachment portion and the second clip is attached to the second attachment portion, the strap is routed over or near the apex of the helmet; and wherein each of the first and second slots has an arcuate curvature, such that when the strap is routed through the first and second slots, the lighting device can be rotated relative to the strap.

17. A helmet attachment device adapted to be mounted to a helmet, the helmet having a first attachment portion located on a first lateral side of the helmet and a second attachment portion located on a second lateral side of the helmet, the helmet further comprising an apex, the helmet attachment device comprising:

a strap, the strap having an axis, a first end, and a second end;

a first clip attached to the first end of the strap, the first clip being specially adapted to attach to the first attachment portion;

a second clip attached to the second end of the strap, the second clip being specially adapted to attach to the second attachment portion;

wherein when the first clip is attached to the first attachment portion and the second clip is attached to the second attachment portion, the strap is routed over or near the apex of the helmet;

the helmet attachment device further comprising an adapter that is attachable to either of the first end or the second end of the strap, the adapter having a central portion, a first arm, and a second arm, the first arm extending from the central portion along a first axis and the second arm extending from the central portion along a second axis, each of the first and second axes being non-aligned with the axis of the strap when the adapter is attached to either of the first end or the second end of the strap, each of the first and second arms being adapted to attach to either of the first attachment portion or the second attachment portion.

18. The helmet attachment device of claim 17, wherein the first arm comprises a first hook and the second arm comprises a second hook.

* * * * *